(12) United States Patent
Irvin, Sr.

(10) Patent No.: US 11,045,750 B2
(45) Date of Patent: Jun. 29, 2021

(54) WATER TREATMENT SYSTEM AND METHOD

(71) Applicant: QWTIP LLC, Park City, UT (US)

(72) Inventor: Whitaker B. Irvin, Sr., Kamas, UT (US)

(73) Assignee: QWTIP LLC, Park City, UT (US)

( * ) Notice: Subject to any disclaimer, the term of this patent is extended or adjusted under 35 U.S.C. 154(b) by 0 days.

(21) Appl. No.: 16/734,543

(22) Filed: Jan. 6, 2020

(65) Prior Publication Data

US 2020/0246726 A1    Aug. 6, 2020

Related U.S. Application Data

(63) Continuation of application No. 15/331,892, filed on Oct. 23, 2016, now Pat. No. 10,576,398, which is a
(Continued)

(51) Int. Cl.
*B01D 21/24*      (2006.01)
*B01D 21/26*      (2006.01)
(Continued)

(52) U.S. Cl.
CPC ...... *B01D 21/2411* (2013.01); *B01D 17/0217* (2013.01); *B01D 21/26* (2013.01);
(Continued)

(58) Field of Classification Search
CPC .. B04C 5/04; B04C 5/08; B04C 5/081; B04C 5/24; B04C 5/26; B04C 5/28; B04C 3/00; B04C 3/04; B04C 2003/003; B04C 2009/005; B04C 2009/007; B01D 17/0217; B01D 21/2411; B01D 21/26; B01D 21/262; B01D 21/265; B01D 21/267;
(Continued)

(56) References Cited

U.S. PATENT DOCUMENTS

| 699,636 | A | 5/1902 | Thrupp |
| 1,061,206 | A | 5/1913 | Tesla |

(Continued)

FOREIGN PATENT DOCUMENTS

| AT | 196680 | 3/1958 |
| DE | 1453730 A1 | 4/1970 |

(Continued)

OTHER PUBLICATIONS

Coats, Callum, "Living Energies," 2001, pp. 107-117, 156-192, 197-200, and 275-293.
(Continued)

*Primary Examiner* — Joseph W Drodge
(74) *Attorney, Agent, or Firm* — Cahn & Samuels, LLP

(57) ABSTRACT

The invention in at least one embodiment includes a system for treating water having an intake module, a vortex module, a disk-pack module, and a motor module. In a further embodiment, a housing is provided over at least the intake module and the vortex module and sits above the disk-pack module. In at least one further embodiment, the disk-pack module includes a disk-pack turbine having a plurality of disks having at least one waveform present on at least one of the disks.

20 Claims, 16 Drawing Sheets

Related U.S. Application Data continuation of application No. 14/240,398, filed as application No. PCT/US2012/052351 on Aug. 24, 2012, now Pat. No. 9,474,991.

(60) Provisional application No. 61/604,494, filed on Feb. 28, 2012, provisional application No. 61/526,834, filed on Aug. 24, 2011.

(51) Int. Cl.
*B04B 5/00* (2006.01)
*B04B 7/00* (2006.01)
*B01D 17/02* (2006.01)
*F04D 17/16* (2006.01)
*C02F 1/38* (2006.01)
*F04D 5/00* (2006.01)
*C02F 103/02* (2006.01)
*C02F 103/34* (2006.01)
*C02F 103/42* (2006.01)

(52) U.S. Cl.
CPC ......... *B01D 21/262* (2013.01); *B01D 21/267* (2013.01); *B04B 5/00* (2013.01); *B04B 7/00* (2013.01); *C02F 1/38* (2013.01); *F04D 5/001* (2013.01); *F04D 17/161* (2013.01); *C02F 2103/023* (2013.01); *C02F 2103/34* (2013.01); *C02F 2103/42* (2013.01)

(58) Field of Classification Search
CPC .... B04B 1/04; B04B 5/00; B04B 5/10; B04B 7/00; F04D 5/00; F04D 5/001; F04D 17/161; F04D 5/007; F04D 7/02; F04D 13/00; F04D 13/02; F04D 13/04; F04D 13/046; F04D 13/06; F04D 13/16; F04D 15/00; F04D 15/0066; F04D 15/02; F04D 17/0217; C02F 1/38; C02F 1/385; C02F 2104/023; C02F 2104/34; C02F 2104/42; C02F 2201/002; C02F 2201/005; C02F 2103/023; C02F 2103/34; C02F 2103/42
USPC ....... 210/512.1, 787; 415/10, 71, 76, 83, 90; 416/3
See application file for complete search history.

(56) References Cited

U.S. PATENT DOCUMENTS

| | | | |
|---|---|---|---|
| 1,374,446 A | 4/1921 | Greenawalt | |
| 1,383,937 A | 7/1921 | Guthrie | |
| 1,820,977 A | 9/1931 | Imhoff | |
| 2,087,834 A | 7/1937 | Brown et al. | |
| 2,173,580 A * | 9/1939 | Fawcett | B04B 1/08 494/4 |
| 2,514,039 A | 7/1950 | Downward | |
| 2,601,519 A | 6/1952 | Hardy et al. | |
| 2,657,802 A | 11/1953 | Reed | |
| 2,752,090 A * | 6/1956 | Kyselka | B04B 1/08 494/60 |
| 3,487,784 A | 1/1970 | Rafferty et al. | |
| 3,514,074 A * | 5/1970 | Self | F16L 55/02781 251/127 |
| 3,623,977 A | 11/1971 | Reid | |
| 3,632,221 A | 1/1972 | Uehling | |
| 3,664,268 A | 5/1972 | Lucas et al. | |
| 3,731,800 A | 5/1973 | Timson | |
| 4,042,351 A | 8/1977 | Anderson | |
| 4,118,207 A | 10/1978 | Wilhelm | |
| 4,172,034 A | 10/1979 | Carlsson | |
| 4,186,554 A | 2/1980 | Possell | |
| 4,201,512 A | 5/1980 | Marynowski et al. | |
| 4,350,236 A | 9/1982 | Stahluth | |
| 4,361,490 A | 11/1982 | Saget | |
| 4,371,382 A | 2/1983 | Ross | |
| 5,146,853 A | 9/1992 | Suppes | |
| 5,215,501 A | 6/1993 | Ushikoski | |
| 5,248,238 A | 9/1993 | Ishida et al. | |
| 5,254,250 A | 10/1993 | Rolchigo et al. | |
| 5,498,329 A | 3/1996 | Lamminen et al. | |
| 5,534,118 A | 7/1996 | McCutchen | |
| 5,744,004 A * | 4/1998 | Ekholm | B01J 3/02 162/237 |
| 5,769,069 A | 6/1998 | Caffell | |
| 5,778,695 A | 7/1998 | Conner | |
| 6,116,420 A | 9/2000 | Horton | |
| 6,227,795 B1 | 5/2001 | Schmoll, III | |
| 6,328,527 B1 | 12/2001 | Conrad et al. | |
| 6,517,309 B1 | 2/2003 | Zaher | |
| 6,682,077 B1 | 1/2004 | Letourneau | |
| 6,692,232 B1 | 2/2004 | Letourneau | |
| 6,719,817 B1 | 4/2004 | Marin | |
| 6,873,235 B2 | 3/2005 | Fiske et al. | |
| 6,890,443 B2 | 5/2005 | Adams | |
| 7,074,008 B2 | 7/2006 | Motonaka | |
| 7,341,424 B2 | 11/2008 | Dial | |
| 7,462,945 B2 | 12/2008 | Baarmann | |
| 7,489,060 B2 | 2/2009 | Qu et al. | |
| 8,623,212 B2 | 1/2014 | Irvin, Sr. et al. | |
| 8,636,910 B2 | 1/2014 | Irvin, Sr. et al. | |
| 9,469,553 B2 | 10/2016 | Irvin, Sr. | |
| 9,474,991 B2 | 10/2016 | Irvin, Sr. | |
| 9,605,563 B2 | 3/2017 | Chardonnet et al. | |
| 9,605,663 B2 | 3/2017 | Irvin, Sr. | |
| 9,707,495 B2 | 7/2017 | Irvin, Sr. | |
| 9,714,176 B2 | 7/2017 | Irvin, Sr. | |
| 9,714,716 B2 | 7/2017 | Cefai | |
| 9,878,636 B2 | 1/2018 | Irvin, Sr. | |
| 10,408,332 B2 * | 9/2019 | Pekarsky | B03C 1/286 |
| 10,463,993 B2 | 11/2019 | Irvin, Sr. | |
| 10,464,824 B2 | 11/2019 | Irvin, Sr. | |
| 10,576,398 B2 | 3/2020 | Irvin, Sr. | |
| 10,682,653 B2 | 6/2020 | Irvin, Sr. | |
| 10,790,723 B2 | 9/2020 | Irvin, Sr. | |
| 2002/0195862 A1 | 12/2002 | Kelly et al. | |
| 2003/0106858 A1 | 6/2003 | Sharpe | |
| 2004/0009063 A1 | 1/2004 | Polacsek | |
| 2004/0159085 A1 | 8/2004 | Carlsson et al. | |
| 2004/0107681 A1 | 10/2004 | Carlsson et al. | |
| 2005/0019154 A1 | 1/2005 | Dial | |
| 2005/0169743 A1 * | 8/2005 | Hicks | F01D 1/36 415/90 |
| 2006/0000383 A1 | 1/2006 | Nast | |
| 2006/0054549 A1 | 3/2006 | Schoendorfer | |
| 2006/0233647 A1 | 10/2006 | Saunders | |
| 2006/0272624 A1 | 12/2006 | Pettersson | |
| 2007/0089636 A1 | 4/2007 | Guardo, Jr. | |
| 2007/0144956 A1 | 6/2007 | Park et al. | |
| 2008/0009402 A1 | 1/2008 | Kane | |
| 2008/0067813 A1 | 3/2008 | Baarmanst | |
| 2008/0168899 A1 | 7/2008 | Decker | |
| 2009/0078150 A1 | 3/2009 | Hasegawa et al. | |
| 2009/0200129 A1 | 8/2009 | Houle et al. | |
| 2009/0283007 A1 | 11/2009 | Taylor | |
| 2009/0314161 A1 | 12/2009 | Al-Alusi et al. | |
| 2010/0107647 A1 * | 5/2010 | Bergen | F23R 3/34 60/772 |
| 2010/0180854 A1 | 7/2010 | Baumann et al. | |
| 2011/0038707 A1 | 2/2011 | Blackstone | |
| 2011/0266811 A1 | 11/2011 | Smadja | |
| 2011/0285234 A1 | 11/2011 | Jang | |
| 2012/0048813 A1 * | 3/2012 | Irvin, Sr. | C02F 1/005 210/787 |
| 2014/0158614 A1 | 6/2014 | Wang | |
| 2014/0183144 A1 | 7/2014 | Irvin, Sr. | |
| 2015/0151649 A1 | 6/2015 | Leung | |
| 2018/0003163 A1 | 1/2018 | Irvin, Sr. | |

(56) References Cited

U.S. PATENT DOCUMENTS

| | | | | |
|---|---|---|---|---|
| 2020/0246726 | A1* | 8/2020 | Irvin, Sr. | ............... F04D 17/161 |
| 2021/0001355 | A1* | 1/2021 | Irvin, Sr. | ............ B01D 21/2411 |

FOREIGN PATENT DOCUMENTS

| | | |
|---|---|---|
| EP | 0101770 A1 | 3/1984 |
| EP | 1898100 A1 | 8/2006 |
| EP | 1770717 A1 | 4/2007 |
| GB | 1063096 | 3/1967 |
| GB | 1187632 | 4/1970 |
| GB | 1262961 | 2/1972 |
| JP | 2009273967 A | 11/2009 |
| JP | 2009276330 A | 11/2009 |
| JP | 2009293984 A | 11/2009 |
| SU | 1625829 A1 | 2/1991 |
| WO | 96/41082 A1 | 12/1996 |
| WO | 2004112938 A1 | 12/2004 |
| WO | 2008054131 A1 | 5/2008 |
| WO | 2009010248 A2 | 1/2009 |
| WO | 2009024154 A1 | 2/2009 |
| WO | 2009109020 A1 | 9/2009 |
| WO | 2010/085044 A2 | 7/2010 |
| WO | 2013/029001 A1 | 2/2013 |

OTHER PUBLICATIONS

Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.

Schauberger, Viktor, translated and edited by Callum Coats, "The Fertile Earth: Nature's Energies in Agriculture, Soil Fertilisation and Forestry," Volume Three of Eco-Technology Series, Mar. 2001, pp. 26-29, 39-43, 18-50, 57-68, and 72-74.

GuardianTrader, Genesis Vortex, http://guardiantrader.com/Genesis_Vortex.html, printed Jul. 12, 2011.

Natural Energy Works, "Wasserwirbler (Water Vortex Shower)", http://www.orgonclab.org/cart/yvortex.htm, printed Jul. 12, 2011.

Wikipedia, "Tesla Turbine," http://en.wikipedia.org/wiki/Tesla_turbine, printed Mar. 23, 2010.

Jens Fischer, "Original Martin-Wirbelwasser", http://fischer-wirbelwasser.de/Schauberger/schauberger.html, printed Jul. 12, 2011.

Wirbelwasser, "Was ist Wirbelwasser?", http://fischer-wirbelwasser.de/Wasserwirbler/Was_ist_Wirbelwasser/body_was_ist_wirbelwasser.html, printed Jul. 12, 2011.

European Patent Office, English Abstract for JP2009293984 (A), printed Mar. 14, 2013.

Fractal Water, LLC, "Structured Water is Fractal Water's Implosion Nozzle Vortex", copyrighted 2012, printed on Dec. 28, 2012 from http://www.fractalwater.com/vortex/.

Fractal Water, LLC, "Magnetic Water Treatment with the Fractal Water Super Imploder Magnetics", copyrighted 2012, printed on Dec. 28, 2012 from http://www.fractalwater.com/magnetics/.

Fractal Water, LLC, "Fractal Water: Vortex Magnetic Systems:: Physics of the Imploder Vortex Nozzle", copyrighted 2012, printed on Dec. 28, 2012 from http://www.fractalwater.com/science/physics-of-the-imploder-vortex-nozzle/.

Fractal Water, LLC, "Buy the Super Imploder from Fractal Water, Vortex Magnetic System", copyrighted 2012, printed on Dec. 28, 2012 from http://www.fractalwater.com/products/imploder-magnetic-water/.

Fractal Water, LLC, "Implosion Water Structured Vortex", copyrighted 2012, printed on Dec. 28, 2012 from http://www.fractalwater.com/products/tri-ploder-vortex/.

Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.

WIPO PCT International Preliminary Report on Patentability, PCT/US2012/052351, dated Feb. 25, 2014.

U.S. Appl. No. 15/295,732 Office Action, dated Mar. 19, 2019.

European Patent Office, Communication pursuant to Article 94(3) EPC in EP Application No. 11 820 579.8, dated Aug. 29, 2019.

European Patent Office, English Machine Translation of SU1625829, printed Jan. 24, 2019.

European Patent Office, English Abstract for JP2009276330 (A), printed Mar. 14, 2013.

European Patent Office, English Abstract for JP2009273967 (A), printed Mar. 14, 2013.

U.S. Patent and Trademark Office, Office Action in U.S. Appl. No. 16/672,477, dated Jan. 29, 2021, p. 7.

* cited by examiner

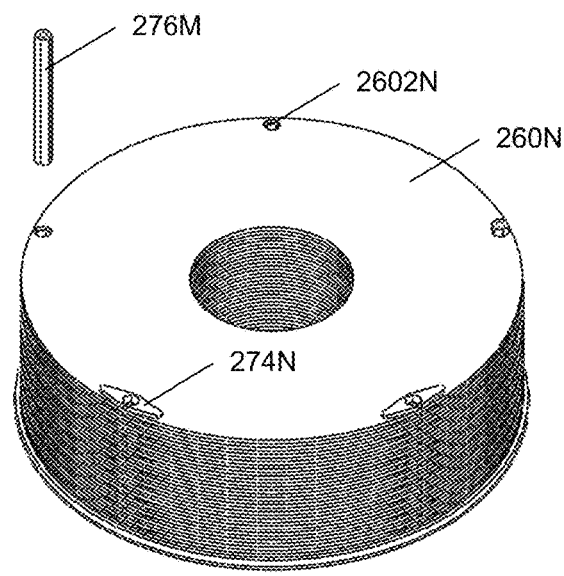
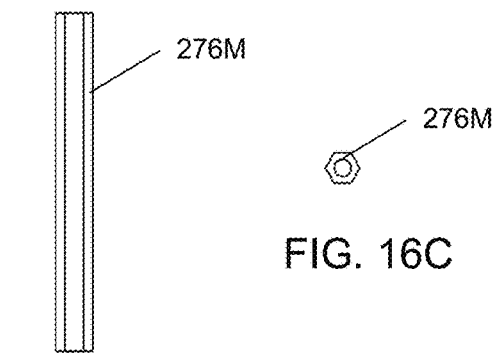
FIG. 16C
FIG. 16B
FIG. 16A
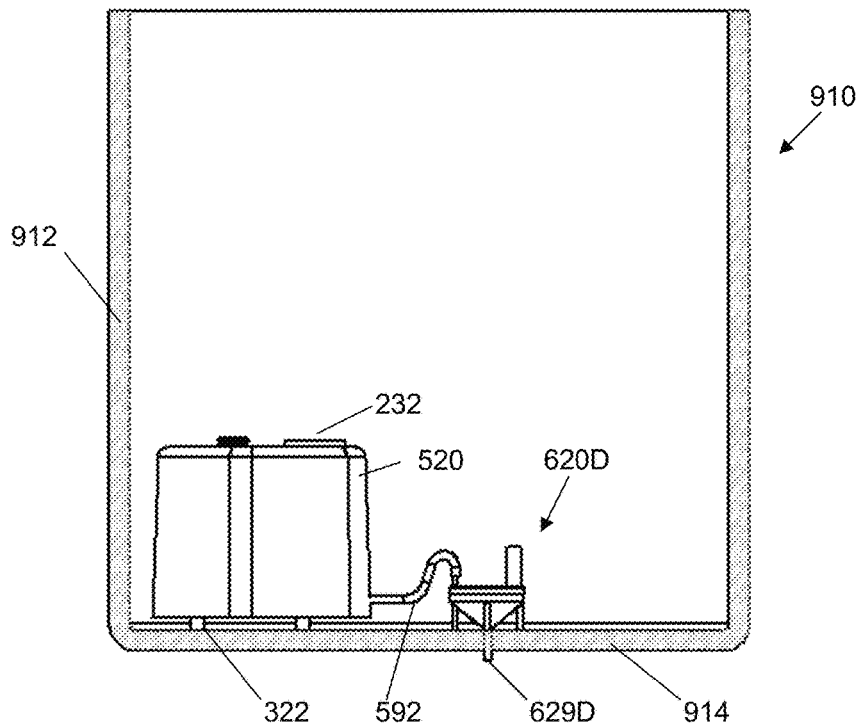
FIG. 19

WATER TREATMENT SYSTEM AND METHOD

This application is a continuation application of U.S. patent application Ser. No. 15/331,892, filed Oct. 23, 2016, which is a continuation application of U.S. patent application Ser. No. 14/240,398, filed Feb. 23, 2014, which is a national stage application of PCT Application No. PCT/US2012/052351, filed Aug. 24, 2012, which claims the benefit of U.S. provisional Application Ser. No. 61/526,834, filed Aug. 24, 2011 entitled "Water Treatment System and Method for Use in Storage Containers" and U.S. provisional Application Ser. No. 61/604,494, filed Feb. 28, 2012 entitled "Water Treatment System", which are all hereby incorporated by reference.

I. FIELD OF THE INVENTION

The invention in at least one embodiment relates to a system and method for use in treating water.

II. SUMMARY OF THE INVENTION

The invention provides in at least one embodiment a system including a motor module having a base; a disk-pack module having a disk-pack turbine in rotational engagement with the motor module; a vortex module in fluid communication with the disk-pack turbine; a plurality of conduits providing the inlets for the vortex module; and a plurality of support members connected to the disk-pack module and the vortex module such that the vortex module is above the disk-pack module. In a further embodiment, the system further includes a housing cover connected to at least one of the plurality of support members, the housing cover including a bottom opening and a cavity in which the vortex module and the disk-pack module reside, and wherein the housing cover and a motor module are spaced from each other or openings are passing through one or both of them such that a fluid pathway runs from external to the housing cover to the conduits. In any of the embodiments, the system in a further embodiment is installed in a water storage container.

The invention provides in at least one embodiment a system having a motor module having a base; a disk-pack module having a disk-pack turbine in rotational engagement with the motor module; a vortex module in fluid communication with the disk-pack turbine; an intake screen defining a space around the vortex module or an intake screen over each conduit feeding the vortex module; and a plurality of conduits extending from the vortex module into the space defined by the intake screen.

The inventions provides in at least one embodiment a system including a motor module having a base; a disk-pack module having a disk-pack turbine in rotational engagement with the motor module, a turbine housing defining an accumulation chamber in which the disk-pack turbine resides, and a discharge housing defining a discharge chamber in fluid communication with the accumulation chamber through a discharge channel and a discharge outlet in fluid communication with the discharge chamber; a vortex module in fluid communication with the disk-pack turbine; a plurality of conduits extending from the vortex module; and an intake screen defining a space around the vortex module and the plurality of conduits or an intake screen over each conduit feeding the vortex module. In a further embodiment to the prior embodiment, each of the conduits defines a passageway from proximate to a bottom of the space defined by the intake screen upwards to the vortex chamber inlets. In a further embodiment to the previous two embodiments, each of the conduits includes a plurality of bends including in one embodiment at least one 90 degree bend and one 45 degree bend. In a further embodiment to the previous three embodiments, the system further includes any one of the housings discussed in this disclosure over at least some of the components or substantially all of the components. In a further embodiment to any of the previous embodiments, the intake module includes an intake screen with a plurality of openings, an intake housing defining an intake chamber, and a plurality of intake outlets in fluid communication with the intake chamber with each intake outlet in fluid communication with the vortex module through a respective conduit. In a further embodiment to any of the previous embodiments, the vortex module includes a vortex chamber having a housing defining a vortex chamber with an outlet axially aligned with the disk-pack turbine, and a plurality of inlets in fluid communication with the vortex chamber. In a further embodiment to any of the previous embodiments, the motor module includes a motor and a driveshaft connected to the motor and the disk-pack turbine. In a further embodiment to any of the previous embodiments, the disk-pack module includes a turbine housing defining an accumulation chamber in which the disk-pack turbine resides; and a discharge housing defining a discharge chamber in fluid communication with the accumulation chamber through a discharge channel and a discharge outlet in fluid communication with the discharge chamber. In a further embodiment to any of the previous embodiments, the disk-pack module further includes a supplemental inlet in fluid communication with the accumulation chamber. In a further embodiment to the previous two embodiments, the discharge housing includes at least one of a spiral protrusion running around a wall of the discharge chamber in an upward direction towards the discharge outlet or a particulate spiral protrusion running around a wall of the discharge chamber in a downward direction towards the particulate discharge port. In a further embodiment to the prior embodiment, the discharge outlet includes a radius flared outwardly wall. In a further embodiment to any of the previous embodiments, the disk-pack turbine includes a plurality of non-flat disks. In a further embodiment to any of the previous embodiments in this paragraph, the disk-pack turbine includes a plurality of disks each having at least two waveforms present between a center of the disk and a periphery of the disk. In a further embodiment to any of the previous two embodiments, the waveform is selected from a group consisting of sinusoidal, biaxial sinucircular, a series of interconnected scallop shapes, a series of interconnected arcuate forms, hyperbolic, and/or multi-axial including combinations of these. In a further embodiment to any of the previous three embodiments, the disk-pack turbine includes a plurality of wing shims connecting the disks. In a further embodiment to any of the previous embodiments in this paragraph, the disk-pack turbine includes a top rotor and a lower rotor. In a further embodiment to the previous embodiment, the top rotor and the lower rotor include cavities.

The invention provides in at least one embodiment a system including a motor; a disk-pack module having a housing having a cavity, and a disk-pack turbine in rotational engagement with the motor, the disk-pack turbine located within the cavity of the housing, the disk-pack turbine having a plurality of disks spaced apart from each other and each disk having an axially centered opening passing therethrough with the plurality of openings defining at least in part an expansion chamber; a vortex module having a vortex chamber in fluid communication with the expansion chamber of the disk-pack turbine; a plurality of conduits in fluid communication with the vortex chamber of the vortex module and extending down from their respective connection points on the vortex module; and an intake screen around the vortex module and the plurality of conduits. In a further embodiment, the system further includes a plurality of support members connected to the disk-pack module and the vortex module. In a further embodiment to the previous two embodiments, the system further includes a discharge housing defining a discharge chamber in fluid communication with the disk-pack housing cavity (or an accumulation chamber) through a discharge channel and a discharge outlet in fluid communication with the discharge chamber. In a further embodiment to any of the previous three embodiments, the cavity in the housing includes an expanding discharge channel around its periphery from a first point to a discharge passageway leading to the discharge chamber. In a further embodiment to any of the previous four embodiments, the cavity of the housing is at least one of a modified torus shape or a scarab shape, which may include the golden mean. In a further embodiment to any of the previous five embodiments, each of the plurality of conduits includes an intake above the disk-pack module.

The invention provides in at least one embodiment a disk-pack turbine having a top rotor having an opening passing through its axial center, a plurality of disks each having an opening passing through its axial center and at least one waveform centered about the opening, a bottom rotor, and a plurality of wing shims connecting the top rotor, the plurality of disks, and the bottom rotor. In a further embodiment to the previous embodiment, the thickness of each disk and/or the height of a space between neighboring disks is less than 2.5 mm or any of the measurements discussed in this disclosure in connection with these components. In a further embodiment to either of the previous two embodiments, each of the plurality of disks has a substantially uniform thickness throughout the disk. In a further embodiment to any of the previous three embodiments, the waveform includes at least one ridge and at least one channel. In a further embodiment to any of the previous four embodiments, the waveform includes at least one circular and/or at least one biaxial waveform. In a still further embodiment to any of the previous five embodiments, the waveform includes at least one of the following: sinusoidal, biaxial sinucircular, a series of interconnected scallop shapes, a series of interconnected arcuate forms, hyperbolic, and/or multi-axial including combinations of these. In a still further embodiment to any of the previous six embodiments, at least two neighboring disks nest together. In a further embodiment to the embodiments discussed in the prior paragraphs, the disk-pack turbine embodiments of this paragraph may be inserted into those above described water systems.

The invention provides in at least one embodiment a method including drawing water into and up a plurality of conduits; forming a vortex flow of the water in a vortex chamber that receives the water from the plurality of conduits; discharging the water from the vortex chamber into an expansion chamber defined in a disk-pack turbine; channeling the water between spaces that exist between disks of the disk-pack turbine to travel from the expansion chamber to an accumulation chamber surrounding the disk-pack turbine; routing the water through the accumulation chamber to a discharge chamber; and forming a vortical flow of the water up through the discharge chamber back into an environment from which the water was drawn and a downward flow of particulate and/or precipitated matter to a particulate discharge port.

Given the following enabling description of the drawings, the system should become evident to a person of ordinary skill in the art.

III. BRIEF DESCRIPTION OF THE DRAWINGS

The present invention is described with reference to the accompanying drawings. In the drawings, like reference numbers indicate identical or functionally similar elements. The use of cross-hatching (or lack thereof) and shading within the drawings is not intended as limiting the type of materials that may be used to manufacture the invention.

FIG. 16A illustrates an alternative wing shim embodiment installed in a partial disk-pack. FIG. 16B illustrates a side view of a support member of the wing shim illustrated in FIG. 16A. FIG. 16C illustrates a top view of a support member of the wing shim illustrated in FIG. 16A.

Figure 17A:
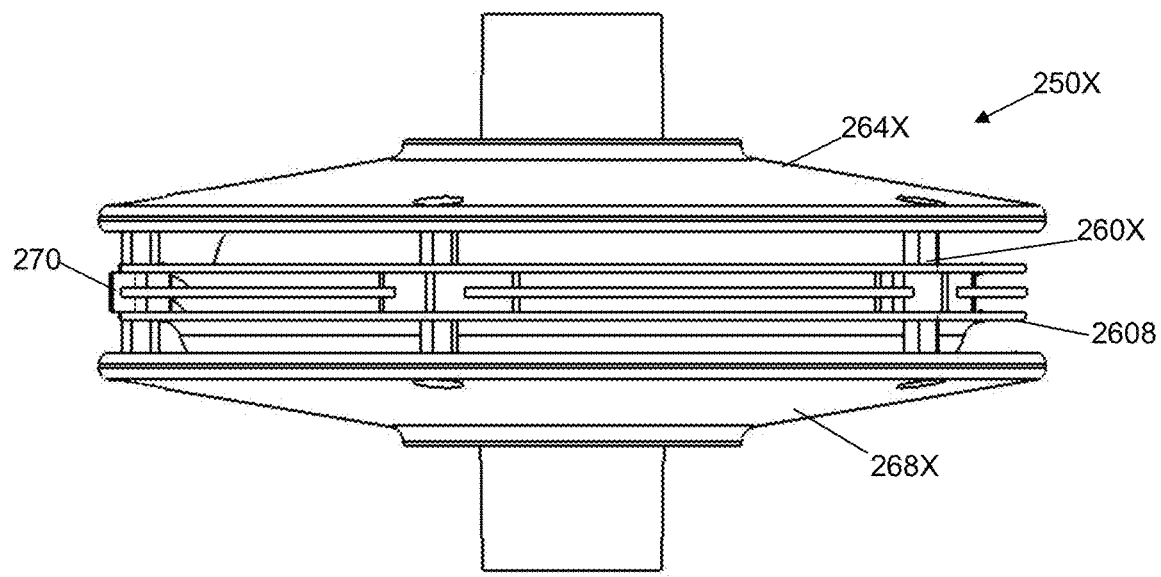
Figure 17B:
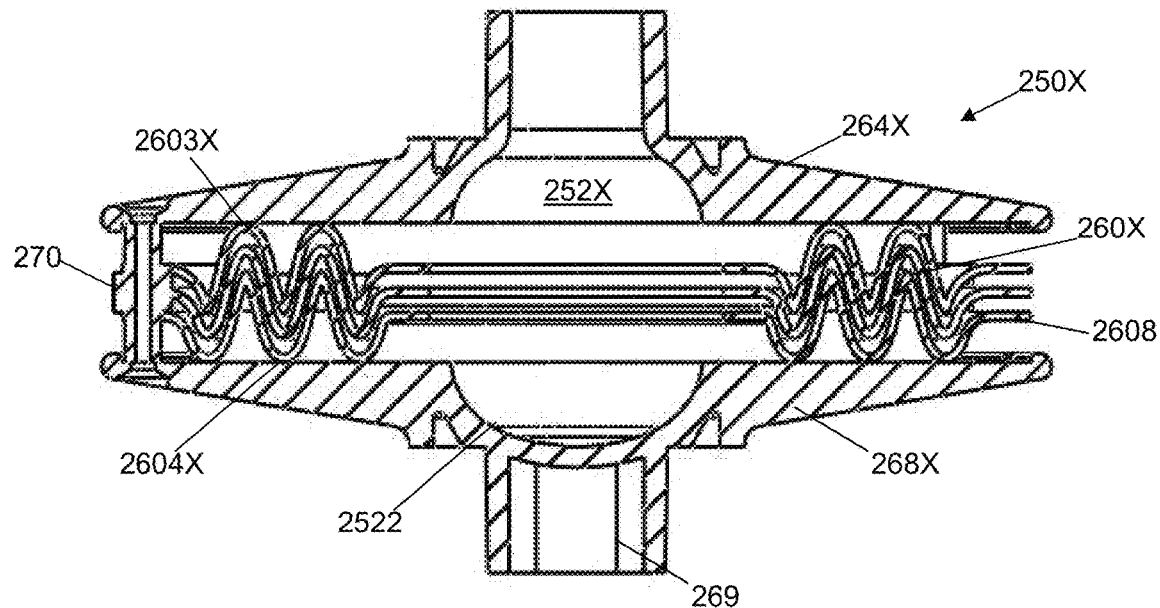

FIGS. 17A and 17B illustrate a waveform disk pack turbine example according to at least one embodiment of the invention.

FIGS. 18A-18E illustrate a waveform disk pack turbine example according to at least one embodiment of the invention.

FIG. 19 illustrates another embodiment according to the invention.

Figure 20A:
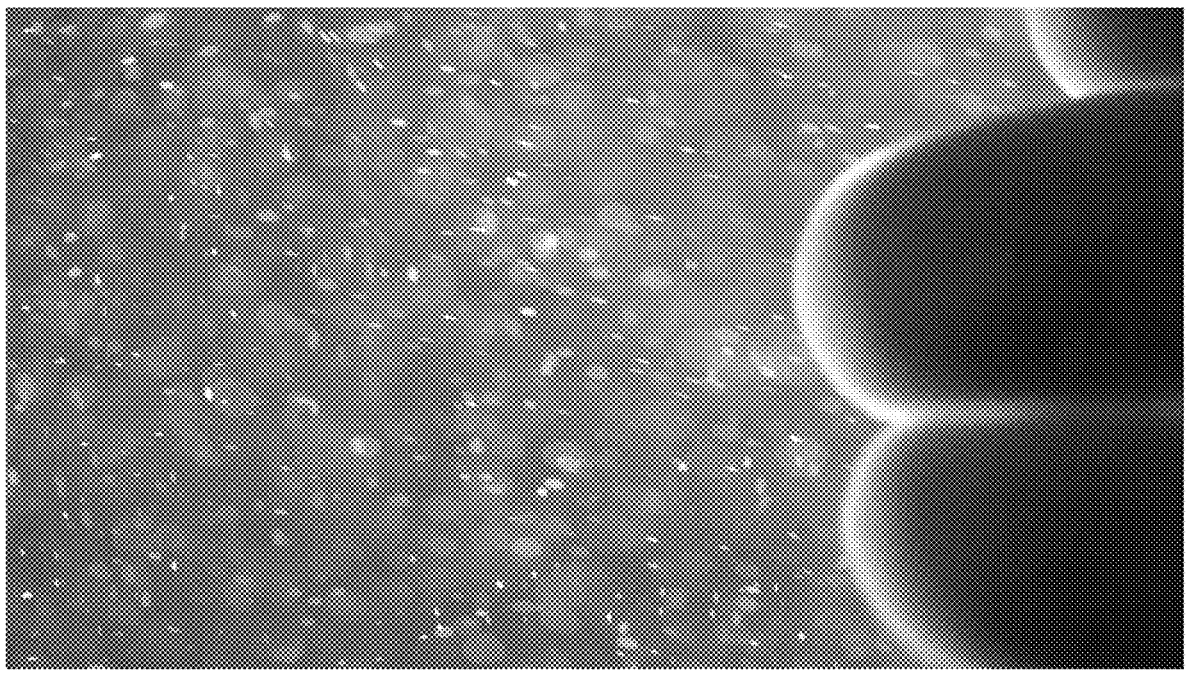
Figure 20B:

FIGS. 20A and 20B depict images of the water after it exits a discharge outlet built according to at least one embodiment of the invention.

IV. DETAILED DESCRIPTION OF THE DRAWINGS

FIGS. 1-19 illustrate example embodiments according to the invention. The illustrated system in at least one embodiment is for treating water that is relatively free of debris such as water present in water storage containers and systems, pools, industrial process systems, cooling towers and systems, municipal and/or tanker supplied water, and well water that are also examples of environments from which water can be drawn. In further embodiments, there are additional filter structures around the intakes of the water treatment system such as a screen box or ring and/or filter material. Although the non-limiting embodiments described herein are directed at water, water should be understood as an example of a fluid, which covers both liquids and gases capable of flowing through a system. The illustrated system includes a housing module 500, an intake module 400, a vortex module 100, a disk-pack module 200, and a motor module 300. The housing module 500 in at least one embodiment is omitted as illustrated, for example, in FIGS. 5-8.

Most of the illustrated and discussed systems have similar modes of operation that include drawing water into and up through a plurality of conduits that extend down from a top of a vortex chamber in which a flow, which is at least one embodiment is a vortex, of the water is formed prior to being discharged into an expansion chamber present in a disk-pack turbine. The water is channeled away from the expansion chamber into the spaces that exist between disks of the disk-pack turbine to travel to an accumulation chamber surrounding the disk-pack turbine where the water is accumulate and circulated into a discharge channel that leads to a discharge chamber. The discharge chamber in at least one embodiment forms a vortical flow of the water up through the discharge chamber back into an environment from which the water was drawn and a downward flow of particulate and/or precipitated matter to a particulate discharge port. In some further embodiments, the mode of operation includes drawing water into a housing that at least substantially encloses the conduits and the vortex chamber where the housing draws the water from below a height of the vortex chamber such as around the disk-pack turbine module or from below an elevated base of the motor module. In a further embodiment to the previous embodiments, the vortical flow of the water includes a significant volume of vortical solitons that are produced by the system and flow into the environment containing the water.

Figure 2:
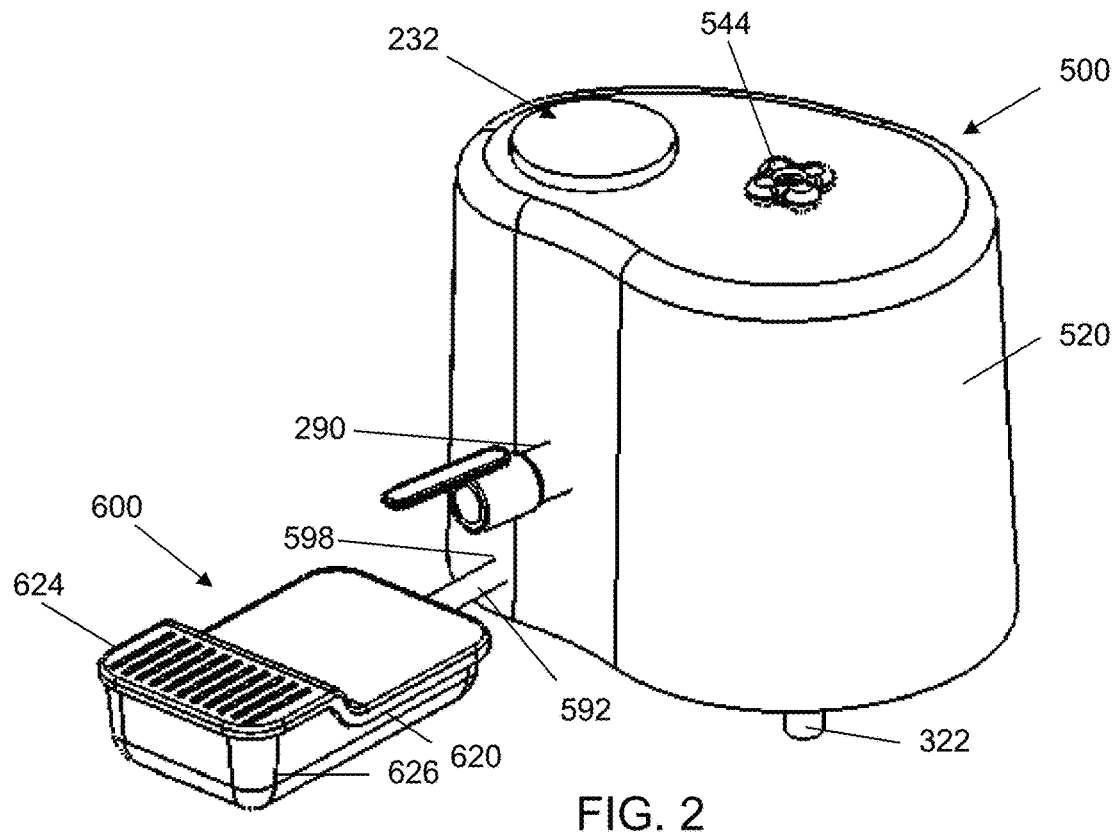
FIGS. 2 and 3 illustrate different external views of another embodiment according to the invention that includes an optional precipitate collection container (or catch basin).
Figure 3:
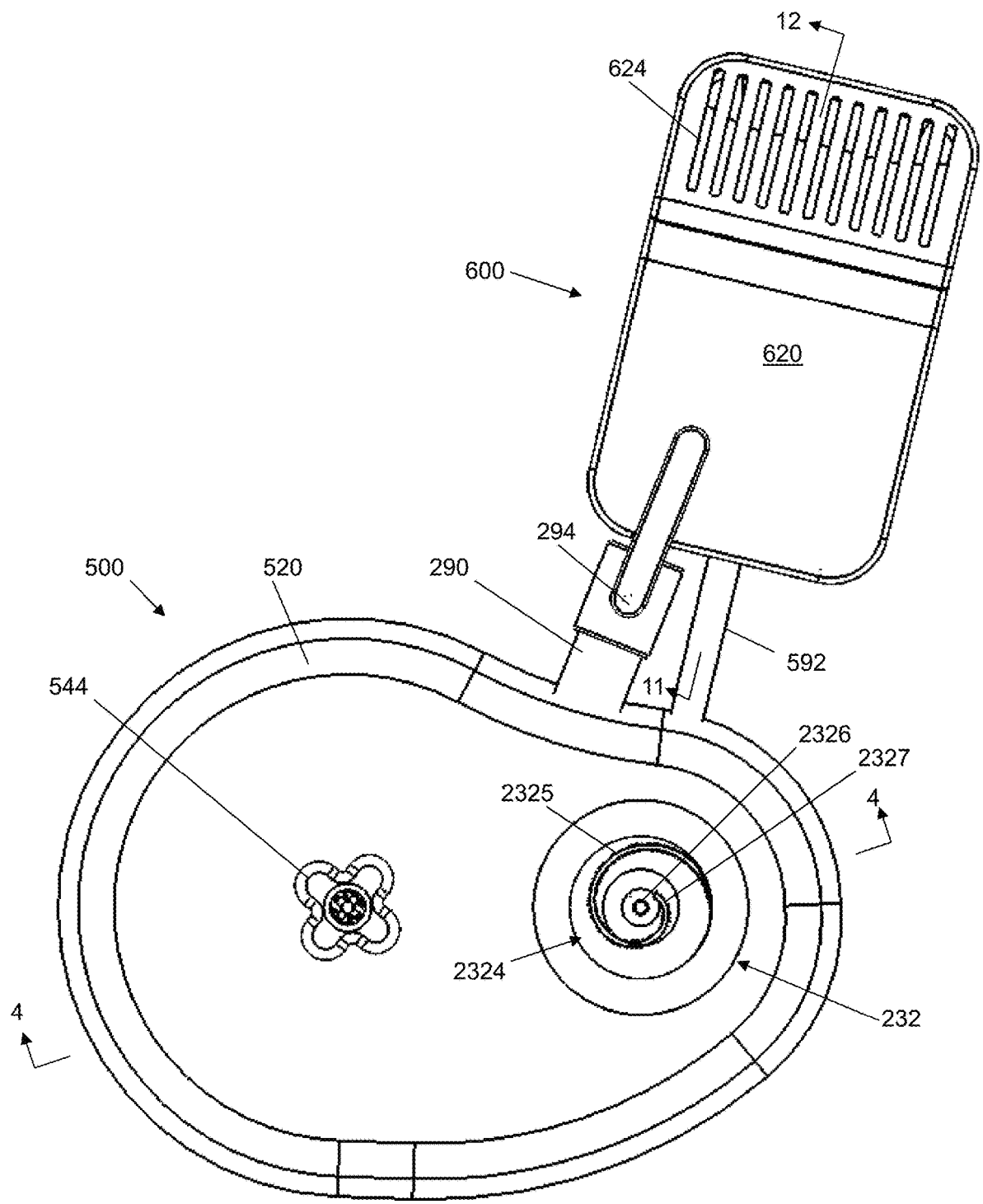
Figure 4:
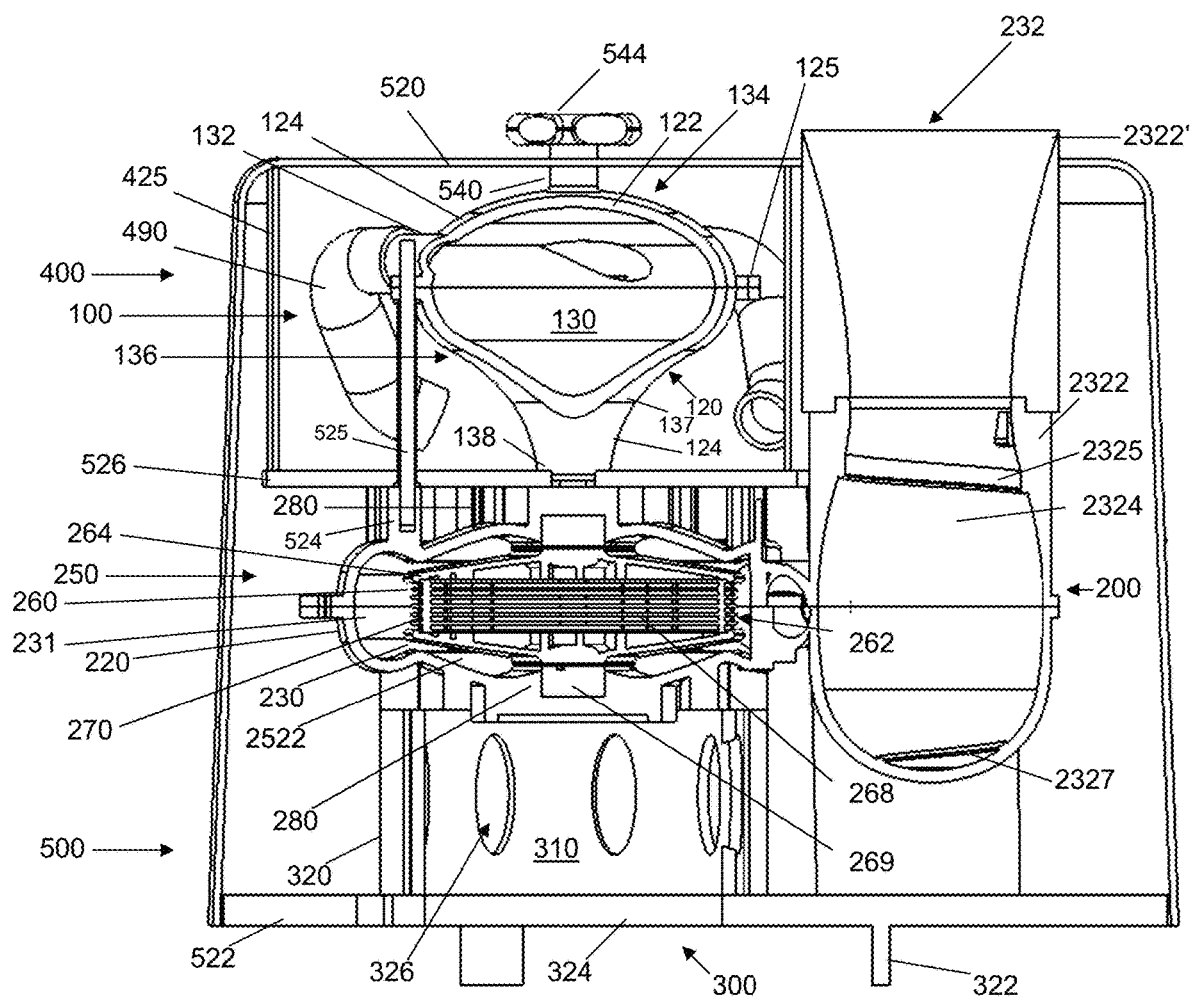
FIG. 4 illustrates a cross-section taken at 4-4 in FIG. 3.

FIGS. 1-4 illustrate an example of a housing module 500 including a cover 520 that covers the intake module 400 having an intake screen 425 and the vortex module 100 as illustrated, for example, in FIG. 4. The housing module 500 includes a plurality of support members 525 that align and support the vortex module 100 and in at least one further embodiment the cover 520 as illustrated, for example, in FIG. 4. The support members 525 in at least one embodiment are incorporated into a top of the disk-pack housing 220 (or attached to support anchors (or bosses) 524 illustrated, for example, in FIG. 4) and spaced around it forming a substantially circular pattern (although other arrangements could be used) as illustrated, for example, in FIG. 9A. Alternatively, the support members 525 are instead anchored to support holes 524A in a support plate 526 illustrated, for example, in FIG. 6; however, in a further embodiment the support members 525 are anchored to both the support anchors 524 and the support holes 524A. The support members 525 extend up through connection points such as mounting ears and/or holes 125 on the vortex housing 120 and the cover 520. In at least one embodiment, the support members 525 do not all extend up to the cover 520 as illustrated, for example, in FIG. 4. In further embodiments, the support members 525 are multi-part. In at least one embodiment the support members 525 are connected to at least one housing/cover with bolts, screws, adhesive, interlocking engagement such as threaded or keyed sections, and the like. In a still further embodiment, the support members 525 act as guide rails for lowering the vortex module 100 onto the disk-pack module 100 as illustrated, for example, in FIG. 4 and in a further embodiment the cover 520 is attached to the top or proximate to the top of the support members 525.

Figure 1:
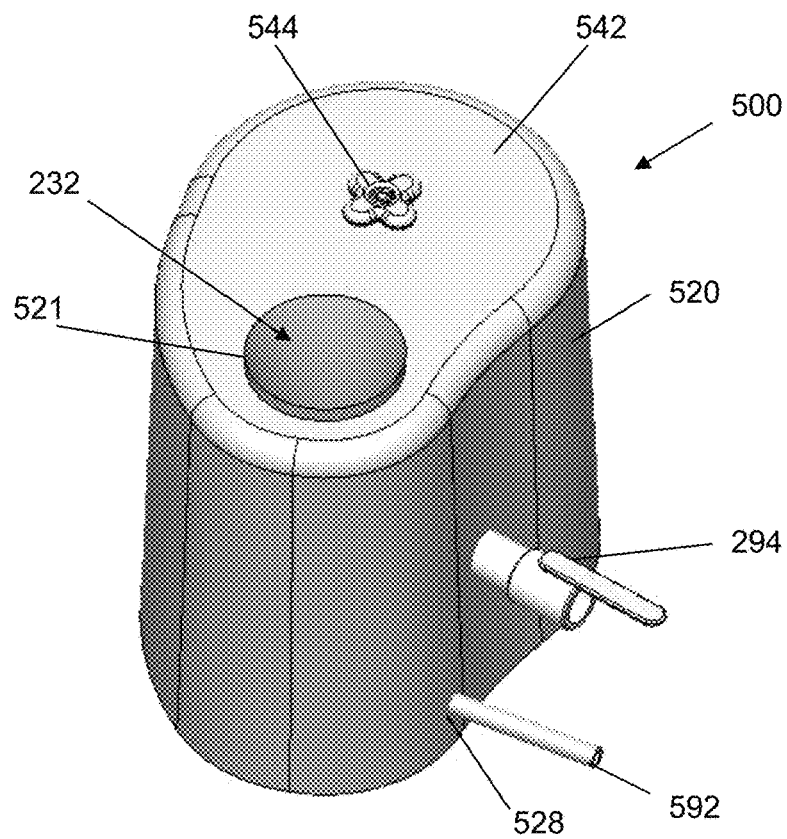
FIG. 1 illustrates a perspective view of an embodiment according to the invention.

In the illustrated embodiment, the cover 520 includes an opening 521 for a discharge outlet (or discharge manifold) 232 to pass through to allow for the flow of water up and away from the discharge outlet 232 as illustrated, for example, in FIG. 1.

FIGS. 1 and 2 illustrate an example of how the cover 520 includes an opening 528 passing through its wall for a conduit 592 to pass through for depositing of precipitated solids external to the system. In a further embodiment, the conduit 592 travels to a point external to the environment in which the system is installed, while in other embodiments a catch (or precipitated collection) container 600 illustrated, for example, in FIGS. 2, 3, and 11-13 or other type of catch container illustrated, for example, in FIGS. 14-15B are examples of how to collect the precipitated solids for later removal.

In at least one embodiment as illustrated, for example, in FIG. 4, the cover 520 of the housing module 500 and the motor module 300 define the inlet (or opening) 522 for water to be pulled into the system through, for example, the motor module base 324. In yet further embodiments, the cover 520 may take a variety of other shapes to that illustrated in the Figures such as a substantially box shape, a fulcrum shape, and a substantially spherical shape. In at least one embodiment, the cover 520 allows for operation of the system in shallower water than the height of the cover 520. In at least one embodiment, the larger and heavier solids that are present in the water that make it past, for example, the inlet 522 will drop out of the upward flow of the water within the cover 520. The water flows in at the inlet 522, which in at least one embodiment provides an initial filter to larger objects from getting into the system, and up to an intake screen 425. The water after passing through the intake screen 425 enters into the vortex intakes (or inlet conduits) 490 that extend down from the vortex inlets 132 of the vortex chamber 130 as illustrated, for example, in FIG. 4. The intake screen 425 blocks material above a certain size based on the size of the openings passing through the screen 425. In a further embodiment, the intake screen includes an O-ring around the bottom rim to seal against a plate 526 that defines the bottom of the space. The plate 526 sits above the disk-pack module 200 as illustrated, for example, in FIGS. 4-8. In at least one further embodiment, the plate 526 includes a gasket to seal around the housing cover 520 where the housing cover 520 includes a first screen layer to provide a block to larger debris that allows the intake screen 425 to block smaller particles/material. The horizontal cross-section of the cover 520 may take a variety of forms other than that illustrated in the Figures including elliptical, oval, parabolic, coma shape, and the top portion of an exclamation mark.

Figure 5:
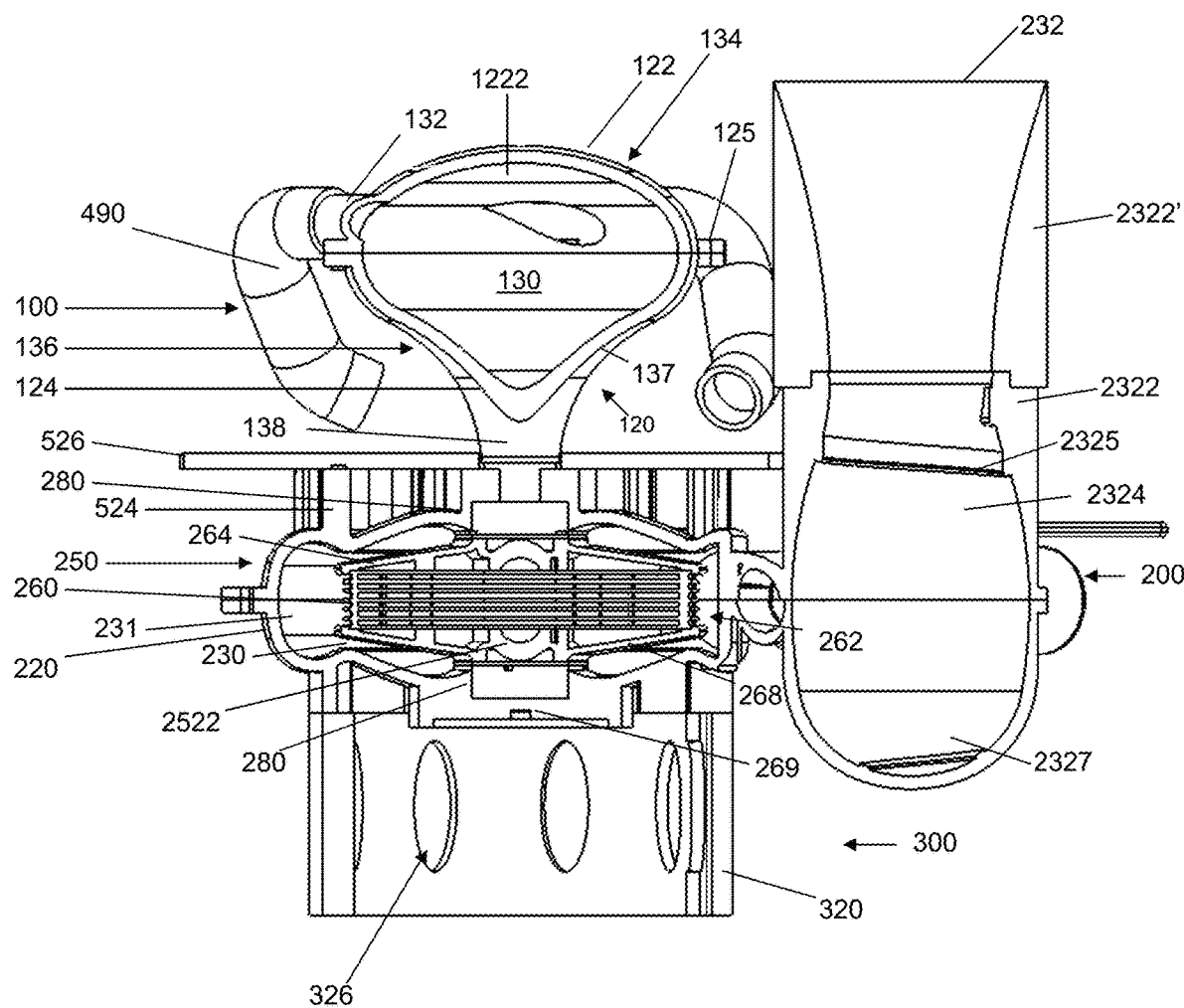
FIG. 5 illustrates a cross-section taken at 4-4 in FIG. 3 but illustrates an embodiment according to the invention that omits a housing according to an embodiment of the invention.
Figure 6:
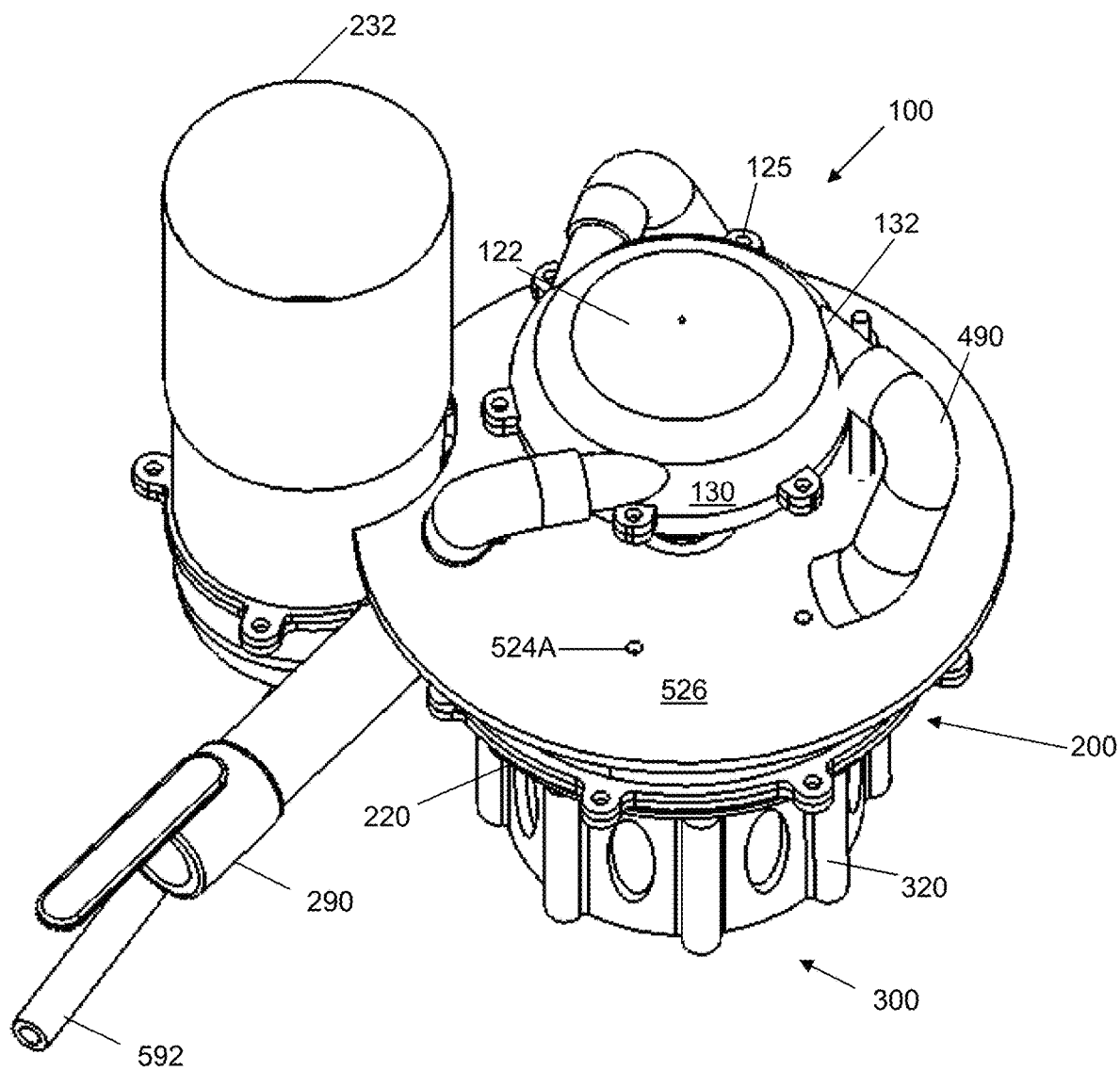
FIGS. 6-8 illustrate different side and/or perspective views of the embodiment illustrated in FIG. 5.
Figure 7:
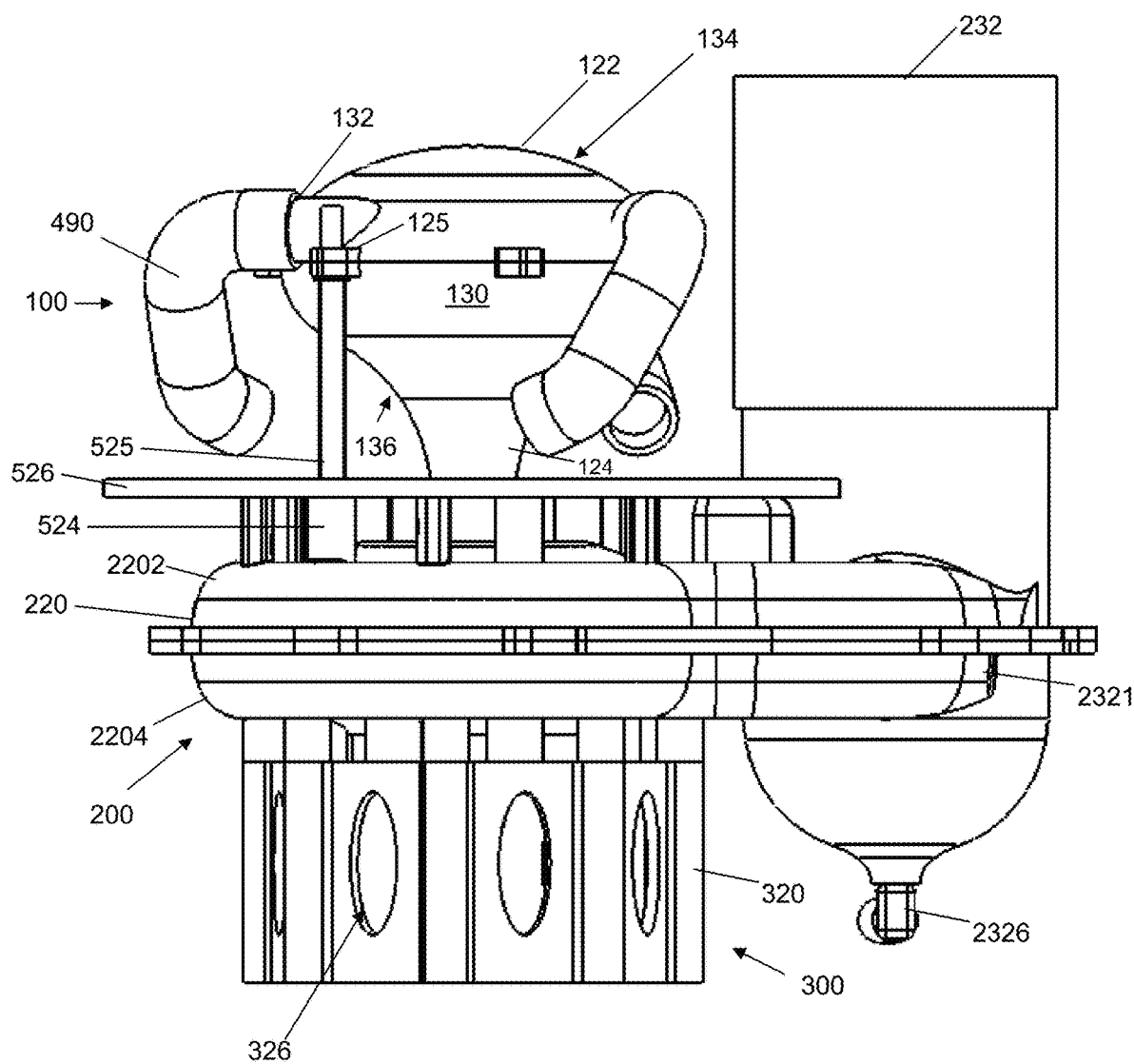
Figure 8:
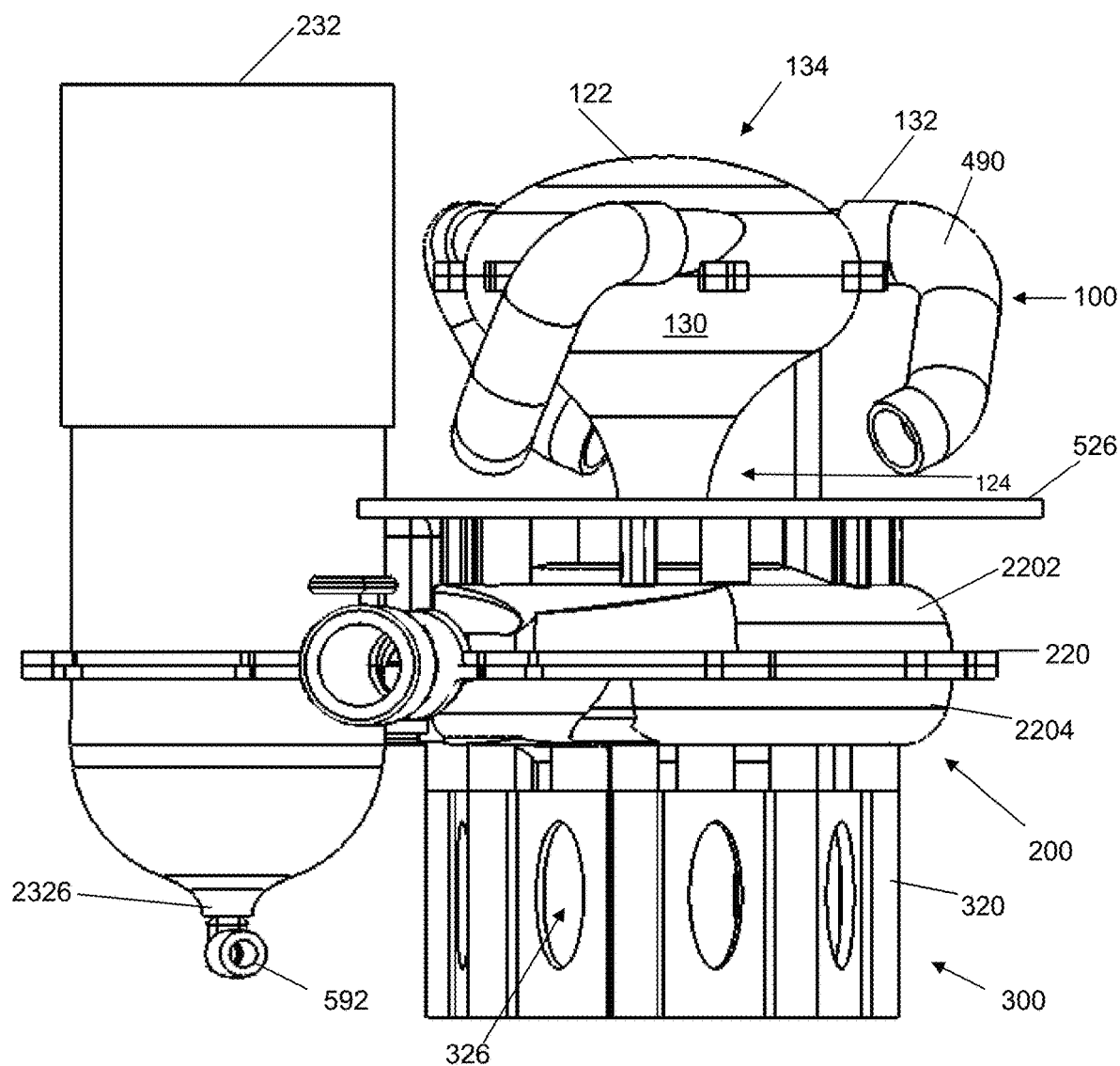

Although the conduits 490 are illustrated as pipes in FIGS. 4-8, based on this disclosure it should be appreciated that the conduits can take a variety of forms while still providing a passageway connecting the area within the intake screen 425 to the vortex chamber 130 via at least one vortex chamber inlet 132. In at least one embodiment, the conduits include at least one 90 degree elbow (or bend) to bend the conduit down from the vortex inlet. In a further embodiment, the conduits each include a further 45 degree elbow to further bend the conduit to provide a partially vertical component to the entry point as illustrated, for example, in FIGS. 7 and 8. In at least one further embodiment, the conduits each include a second 45 degree elbow, which in at least one embodiment allows the conduits to be proximate to (or in at least one embodiment flush with) the bottom of the space defined by the intake screen, which in FIG. 5 is illustrated as a plate 526. In at least one embodiment, the respective pairs of the intake conduit 490 and the vortex inlet 132 are integrally formed together. In at least one alternative embodiment, the illustrated conduits 490 include at least one section of flexible conduit. In a further embodiment, the support members 524, 525 are omitted, and instead the bottoms of the conduits 490 rest against the support plate 526 (or if the support plate 526 is omitted, then against the disk-pack housing 120) such that the conduits 490 assist in holding the vortex module 100 in place over the disk-pack module 200.

As illustrated, for example, in FIGS. 4 and 5, the vortex induction chamber 130 is a cavity formed inside a housing 120 of the vortex module 100 to shape the in-flowing water into a through-flowing vortex that is fed into the disk-pack module 200. The illustrated vortex chamber 130 includes a structure that funnels the water into a vortex upper section 134 having a bowl (or modified concave hyperbolic) shape for receiving the water that opens into a lower section 136 having a conical-like (or funnel) shape with a steep vertical angle of change that opens into the disk-pack module 200. The vortex chamber 130 in at least one embodiment serves to accumulate, accelerate, stimulate and concentrate the water as it is drawn into the disk-pack module 200 via centrifugal suction. In at least one embodiment, the vortex chamber 130 is formed by a wall 137. The sides of the wall 137 follow a long radial path in the vertical descending direction from a top to an opening 138 that reduces the horizontal area defined by the sides of the wall 137 as illustrated, for example, in FIG. 4.

As illustrated, for example, in FIGS. 4 and 5, the illustrated housing 120 of the vortex module 100 includes a two-part configuration with a cap 122 and a main body 124. The cap 122 and the main body 124 can be attached in a variety of ways including, for example, with screws, bolts, adhesive, interlocking engagement such as threaded or keyed sections, support members 525, etc. In at least one embodiment, the cap 122 and the main body 124 form the vortex inlets 132 when assembled together. In an alternative embodiment, the cap 122 is illustrated, for example, in FIG. 4 as having the top portion of the vortex chamber 130 formed by a concentric concave depression 1222 on the inside face of the cap 122. The cap 122 and the main body 124 together form the plurality of vortex inlets 132. Based on this disclosure, one of ordinary skill in the art should understand that the vortex housing could have different configurations of housing components while still providing a vortex chamber in which a vortex flow can be established.

The main body 124 is illustrated as having a passageway passing vertically through it to form the lower portion 136 of the vortex chamber 130. The main body 124 in at least one embodiment is attached to the disk-pack housing 220 with the same support members 525 used to attach the cap 122 to the main body 124 as illustrated, for example, in FIG. 4. Other examples for attaching the main body 124 to the disk-pack module 200 include adhesive, screws, and interlocking engagement such as threaded or keyed sections, and friction engagement. In at least one embodiment, the main body 124 sits in and/or on the disk pack turbine module 200.

Figure 18A:
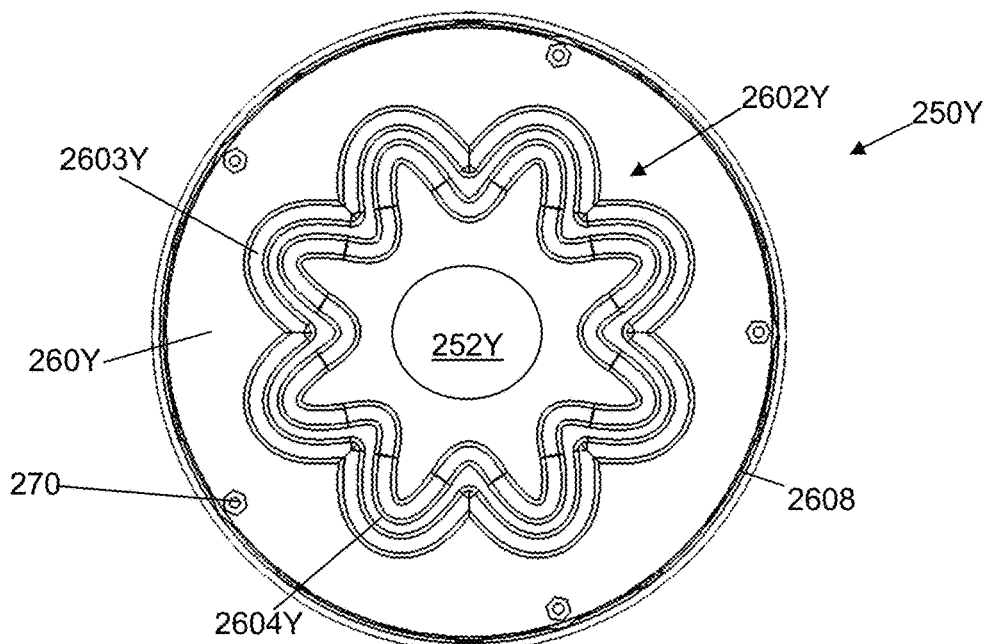
Figure 18B:
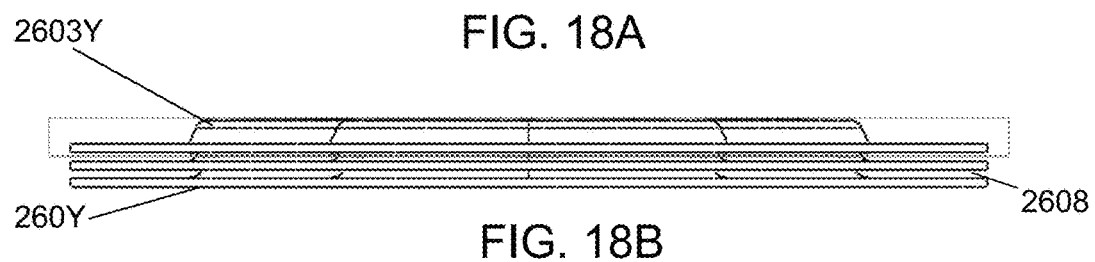
Figure 18C:
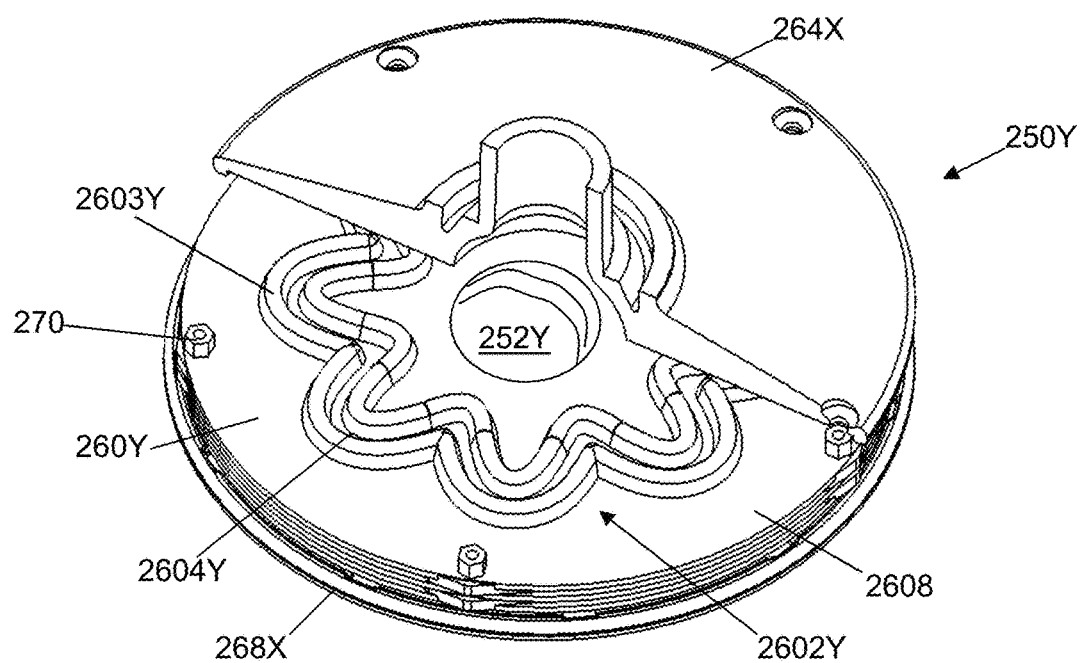

In at least one embodiment, as the rotating, charging water passes through the base discharge opening 138 of the vortex induction chamber 130 it is exposed to a depressive/vacuum condition as it enters into the revolving expansion and distribution chamber (or expansion chamber) 252 in the disk-pack module 200 as illustrated, for example, in FIGS. 5, 17B, and 18C. The disk-pack module 200 includes (or forms) the revolving expansion chamber 252 that is illustrated as having an oval/elliptical/egg-shape chamber that includes a curved bottom portion provided by a rigid feature 2522 incorporated into the bottom rotor 268 of the disk-pack turbine 250 in at least one embodiment. Most of the volumetric area for the expansion chamber 252 is formed by the center holes in the separated stacked disks 260 which serve as water inlet and distribution ports for the stacked disk chambers 262 where each chamber is formed between two neighboring disks. The top portion of the expansion chamber 252 roughly mirrors the bottom with the addition of an opening passing through an upper rotor 264 that is bordered by a curved structure as illustrated, for example, in FIG. 17A. The opening is centered axially with the vortex induction chamber outlet 138 above it as illustrated, for example, in FIGS. 4 and 5, providing a pathway through which the water can pass between the two respective chambers. In at least one embodiment, the expansion chamber 252 has a substantially egg shape as illustrated, for example, in FIGS. 17B, 18C, and 18E.

An example of a disk-pack turbine 250 is illustrated in FIGS. 4, 5 and 17A-18E. The illustrated disk-pack turbine 250 includes the top rotor 264, a plurality of stacked disks 260, and the bottom rotor 268 having a concave radial depression 2522 that provides a bottom for the expansion chamber 252. The illustrated bottom rotor 268 includes a motor hub 269, which in some embodiments may be integrally formed with the bottom rotor 268. The motor hub 269 provides the interface to couple the disk-pack turbine 250 to a drive shaft extending from the motor module 300. The top rotor 264, the bottom rotor 268, and/or the motor hub 269 are coupled to the housing 220 with a bearing element (or a bushing) 280 or have a bearing incorporated into the piece to allow for substantially reduced rotational friction of the disk-pack turbine 250 relative to the housing as driven by the drive shaft and the motor.

Centrifugal suction created by water progressing from the inner disk-pack chamber openings, which are the holes in the center of the disks 260, toward the periphery of the disk chambers 262 establishes the primary dynamics that draw, progress, pressurize and discharge fluid from the disk-pack turbine 250. The viscous molecular boundary layer present on the rotating disk surfaces provides mechanical advantage relative to impelling water through and out of the disk-pack turbine 250.

In at least one embodiment, the disk-pack turbine includes a plurality of wing-shims 270 (illustrated in FIG. 4) spaced near (or at) the outer edge of the individual disks 260. Examples of wing-shims are provided in U.S. patent application Ser. No. 13/213,614 published as U.S. Pat. App. Pub. No. 2012/0048813, which is hereby incorporated by reference in connection with the disclosed wing-shims 270 et seq. The wing-shims provide structure and support for the disks 260 in the disk-pack turbine 250 and in at least one embodiment are responsible for maintaining disk positions and separation tolerances. The disk separation provides space (or disk chambers) 262 through which water travels from the expansion chamber 252 to the accumulation chamber 230. In an alternative embodiment, the wing shims are located around and proximate to the expansion chamber 252. In at least one embodiment, the wing shims assist the creation of a negative pressure without sheering of or forming cavitations in the water and assist the movement of the water into the accumulation chamber.

The disk-pack turbine 250 is held in place by the housing 220 of the disk-pack module 200 as illustrated, for example, in FIGS. 4 and 5. The housing 220 includes an accumulation chamber 230 in which the disk-pack turbine 250 rotates. The accumulation chamber 230 is illustrated, for example, in FIGS. 9A-10B as having a modified torus shape or scarab shape, which may include the golden mean, (or in an alternative embodiment a hyperbolic paraboloid cross-section) that leads to a discharge outlet 232 on the outside periphery of the housing 220. In this illustrated embodiment, there is one discharge outlet 232, but one or more discharge outlets 232 may be added and, in at least one embodiment, the discharge outlets 232 are equally spaced around the housing periphery.

Once the fluid passes through the disk-pack turbine 250, it enters the accumulation chamber 230 in which the disk-pack turbine 250 rotates. The accumulation chamber 230 is an ample, over-sized chamber within the disk-pack module 200 as illustrated, for example, in FIGS. 4 and 5. The accumulation chamber 230 gathers the fluid after it has passed through the disk-pack turbine 250. The highly energetic water with concentrated mixed motion smoothly transitions to be discharged at low pressure and low linear velocity (with a large velocity in at least one embodiment within the motion including micro-vortices) through the discharge outlet 232 back into the environment from which the water was taken. As illustrated, for example, in FIGS. 4 and 5, the shape of the accumulation chamber 230 is designed to provide its shortest height proximate to the perimeter of the disk-pack turbine 250. Beyond the shortest height there is a discharge channel 231 that directs the water around to the discharge outlet 232 and also in at least one embodiment provides for the space to augment the water in the accumulation chamber 230 through an optional supplemental inlet 290 illustrated, for example, in FIGS. 9A, 9C and 10A. The discharge channel 231 has a substantially elliptical cross-section (although other cross-sections are possible) as illustrated, for example, in FIGS. 4 and 5. The accumulation chamber wall in at least one embodiment closes up to the perimeter of the disk pack turbine 250 at a point proximate to the discharge channel 231 exits the accumulation chamber 230 to provide a passageway that travels towards a discharge chamber 2324 as illustrated, for example, in FIGS. 9C and 10A.

Figure 9A:
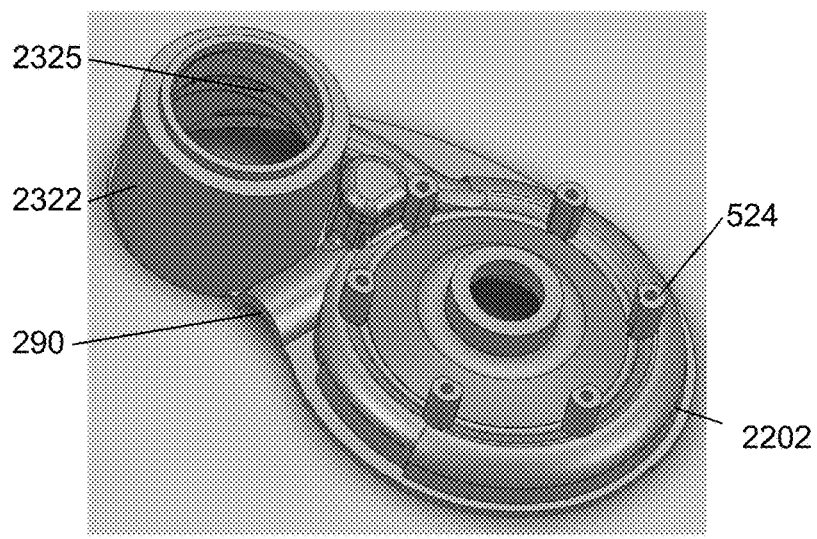
FIGS. 9A-9C illustrate views of the upper disk-pack turbine housing including a top view, a cross-section view, and a bottom view.
Figure 9B:
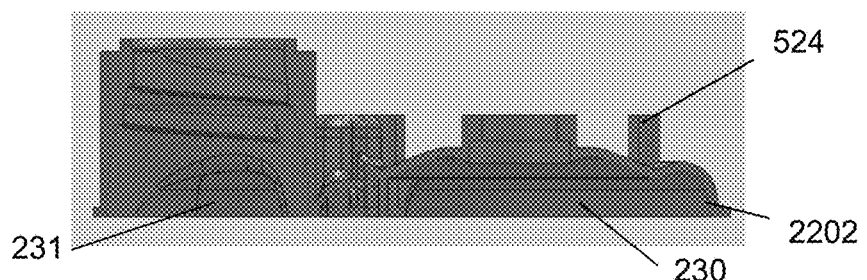
Figure 9C:
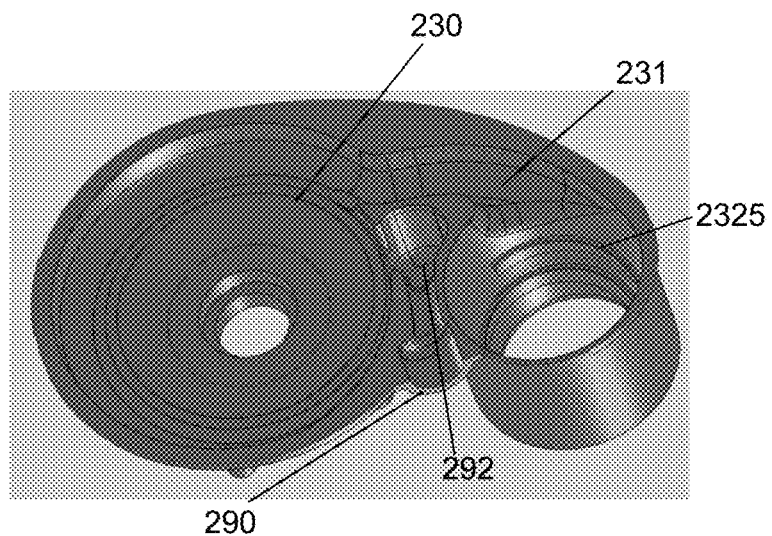
Figure 10A:
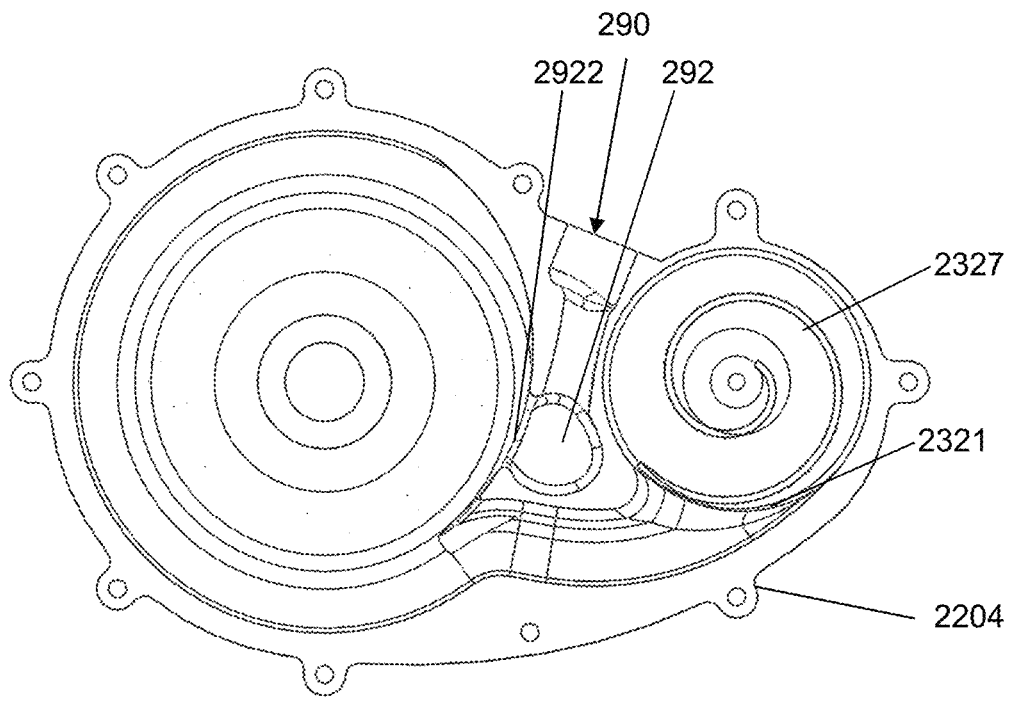
FIGS. 10A and 10B illustrate views of the lower disk-pack turbine housing including a top view and a side view.
Figure 10B:
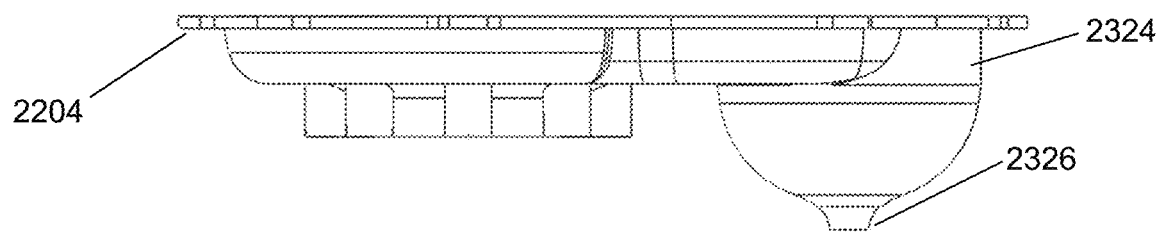

The illustrated housing 220 includes a top section 2202 and a bottom section 2204 that together form the housing and the illustrated accumulation chamber 230 with a discharge channel 231 extending substantially around the periphery of the accumulation chamber 230. FIGS. 9A-9C illustrate the top section 2202, while FIGS. 10A-10B illustrate the bottom section 2204. As illustrated in FIG. 10B, the bottom section 2204 includes a particulate discharge port 2326 that in at least one embodiment includes a spiraling protrusion 2327 illustrated, for example, in FIG. 10A.

FIGS. 9A-10B illustrate the presence of the supplemental inlet 290 into the accumulation chamber 230 to augment the water present in the accumulation chamber 230. As illustrated, the supplemental inlet 290 enters the accumulation chamber 230 at a point just after the discharge channel 231 extends away from the accumulation chamber 230 to route fluid towards the discharge chamber 2324. As illustrated in FIG. 10B, the supplemental inlet 290 includes a curved bottom 2922 that extends out from an inlet feed chamber 292 into the start of the discharge channel 231 as it expands and travels in a counter-clockwise direction away from the accumulation chamber 230 and the supplemental inlet 290. In at least one embodiment, the inlet feed chamber 292 shapes the incoming flow of water from the supplemental inlet 290 to augment the counter-clockwise flow of water in the accumulation chamber 230 and the discharge channel 231. In at least one embodiment, this is accomplished by the creation of a vortical flow in the inlet feed chamber 292. In at least one embodiment, the supplemental inlet 290 includes an optional valve 294 to control the level of augmentation as illustrated, for example, in FIGS. 1-3. Although the value 294 is illustrated as being a manual valve, it should be understood based on this disclosure that the valve could be electronically controlled in at least one embodiment. Based on this disclosure, it should be understood that the valve 294 may take a variety of structures. In an alternative embodiment, the supplemental inlet 290 is omitted as it is being an optional component to the illustrated system.

The discharge outlet 232 includes a housing 2322 having a discharge chamber 2324 that further augments the spin and rotation of the water being discharged as the water moves upwards in an approximately egg-shaped compartment. In an alternative embodiment, the output of the discharge outlet 232 is routed to another location other than from where the water was drawn into the system from. In at least one embodiment as illustrated, for example, in FIGS. 4 and 5, the housing 2322 includes an upper housing 2322', which can be a separate piece or integrally formed with housing 2322 that defines an expanding diameter cavity for discharging the water from the system. The discharge chamber 2324 includes a particulate discharge port 2326 that connects to a conduit 592 as illustrated, for example, in FIG. 8 to remove from the system, for example, particulate, precipitated matter and/or concentrated solids that have precipitated out of the water during processing and to route it away from the system in at least one embodiment. In at least one embodiment as illustrated, for example, in FIGS. 4 and 5, the shape of the discharge chamber 2324 facilitates the creation of a vortex exit flow for material out through the particulate discharge port 2326 and a vortex exit flow for the water out through the discharge outlet 232 forming multiple vortical solitons that float up and away from the discharge outlet 232 spinning and in many cases maintaining a relative minimum distance amongst themselves as illustrated in FIGS. 20A and 20B. The vortical solitons in this embodiment continue in motion in the container in which they are discharged until they are interrupted by another object.

In at least one embodiment, the discharge chamber 2324 includes at least one spiraling protrusion 2325 (illustrated, for example, in FIGS. 4, 5, and 9C) that extends from just above (or proximate) the intake (or discharge port or junction between the passageway coming from the accumulation chamber 230 and the discharge chamber 2324) 2321 (see FIG. 9C) into the discharge chamber 2324 up through or at least to the discharge outlet 232 (and/or upper housing 2322' illustrated in, for example, FIG. 9A) to encourage additional rotation in the water prior to discharge. In at least one embodiment, the spiraling protrusion 2325 extends up through the discharge outlet 232. The spiraling protrusion 2325 in at least one embodiment spirals upward in a counterclockwise direction when viewed from above; however, based on this disclosure it should be appreciated that the direction of the spiral could be clockwise, for example, if these system were used in the southern hemisphere.

In at least one embodiment, the discharge chamber 2324 includes at least one (second or particulate) spiraling protrusion 2327 that extends from just below and/or proximate to the intake 2321 down through the discharge chamber 2324 towards the particulate discharge port 2326 as illustrated, for example, in FIG. 10A. When viewed from above in FIG. 10A, the spiraling protrusion 2327 spirals in a counter-clockwise direction; however, based on this disclosure it should be appreciated that the direction of the spiral could be clockwise, for example, if the system were used in the southern hemisphere. Based on this disclosure, it should be understood that one or both of the spiraling protrusions 2325, 2327 could be used in at least one embodiment. In an alternative embodiment to the above protrusion embodiments, the protrusions are replaced by grooves formed in the discharge chamber wall.

As illustrated in FIGS. 4 and 5, the discharge chamber's diameter shrinks as it approaches the upper housing 2322', which as illustrated includes a long radii expanding back out to decompress the discharged water for return to the storage tank or other water source. In an alternative embodiment, the long radii begins proximate to the intake 2321 in the discharge chamber 2324. This structure in at least one embodiment provides for a convergence of flow of water prior to a divergence back out of the flow of water.

The base of the system illustrated, for example, in FIG. 4 is the motor module 300 that includes a housing 320 with an outwardly extending base 324 having a plurality of feet 322 spaced around the periphery of the base 324 to provide support and distribute the weight of the system out further to provide stability in at least one embodiment. In at least one further alternative embodiment, the feet 322 are spaced around the periphery of the base 324. In at least one embodiment the base 324 extends out to the perimeter of the bottom of the housing cover 520 to in at least one embodiment define a space formed by the base 324 and the inside of the housing cover 520. The motor housing 320 substantially encloses the motor (not illustrated, but would be present where the number 310 is located in FIG. 4); however, as illustrated in FIGS. 4 and 5, there are multiple openings 326 through which water can pass and cool the motor in at least one embodiment. The motor housing 320 provides the base on which the disk-pack module 200 rests and is connected to by bolts or the like connection members. In at least one further embodiment, the base 324 is included as part of the housing module 500. In at least one further embodiment, the base 324 is omitted and the motor is attached to and/or supported by the housing 320. In yet a further embodiment, the base 324 is replaced by a plurality of horizontal support members running from the motor housing 320 to the housing cover 520 providing structural support to the housing cover 520 and a place to have the footings 322 depend from in embodiments having footings.

In a further embodiment to the above-described embodiments, the housing cover 520 is omitted. An example of how the system may look like is illustrated in FIGS. 5-8, which omit the housing cover 520 and the intake screen 425, which in at least one embodiment takes the form of a cylindrical filter screen, that would fit over the intakes 490 and vortex module 300. One adjustment to the system depicted in these figures is that the support members 524 would be shortened to provide a flush surface on the top for the intake screen 425, which would include a top that optionally could be solid or have a plurality of openings passing therethrough that in at least one embodiment are substantially the same size as the intake screen 425.

In a further alternative embodiment, the intake screen 425 is omitted from the system. In a further alternative embodiment to the omission of the intake screen 425 or other alternative embodiments is to include attaching the housing cover 520 to the system directly through a plurality of the support members rising above the vortex chamber through one or more cross bars running across at least two support members to provide a connection point.

In a further alternative embodiment, the intake screen 425 is omitted, but replaced by a screen over the intake openings passing through the housing cover 520. In another alternative embodiment the intake screen 425 is omitted, but replaced by a filter member attached to each open end of the inlet conduit 490. An example of the filter member is a screen with a threaded base that is secured to the vortex conduit through a threaded connection. Other examples of ways to attach the filter member include press fitting, adhesive, integral integration into the conduit, etc.

In a further embodiment, the housing cover 520 and intake screen 425 are attached to the cap 122 of the vortex housing 120 with a threaded bolt that extends up from the cap 122 as illustrated, for example, in FIG. 4. In a further embodiment, the vortex housing 120 includes a boss 540 extending up from the vortex cap 122 that includes a threaded opening for engaging the threaded bolt 542 that passes through a handle 544 as illustrated, for example, in FIGS. 1 and 4. In at least one embodiment this structure provides compression of the top of the intake screen 425 between it and the inside of the top of the housing cover 520. In a further embodiment, the intake screen 425 includes an open top that includes an O-ring around the top rim to seal against the inside of the top of the housing cover 520 as illustrated, for example, in FIG. 4. In at least one further embodiment, the handle 544 can further also provide an air release when the system is initially placed in the water or alternatively a separate valve structure can be provided along the top of the housing 520.

In a further embodiment to at least one of the previously described embodiments, the components are rearranged/reconfigured to change the rotation provided by the system in the opposite direction, for example, for use in the Southern Hemisphere.

FIGS. 2, 3 and 11-13 illustrate different optional precipitate collection modules 600 having a precipitate collection container 620 according to the invention. FIGS. 2 and 3 illustrate an example of a precipitate collection container 620 connected to an embodiment of the system; however, based on this disclosure it should be appreciated that the different precipitate collection modules 600 could be attached to the various embodiments for the system discussed in this disclosure along with other water treatment systems having a precipitate discharge component. One of ordinary skill in the art should realize that the precipitate collection container 620 can take a variety of shapes and forms beyond that illustrated in FIGS. 2, 3 and 11-15B while still providing a cavity 622 to receive, for example, particulate, precipitated matter and/or concentrated solids or similar material and a screened discharge (or screen) 624 such as that illustrated on an exit port 626. In an alternative embodiment, the raised portion is a taller pipe structure (or riser) 626C extending up from the rest of the precipitate collection container 620C as illustrated, for example, in FIG. 14. In the illustrated embodiments of FIGS. 11-13, a screen 624 is included at least in part to allow for water to pass through while preventing the material from passing back out into the water being processed.

Figure 11:
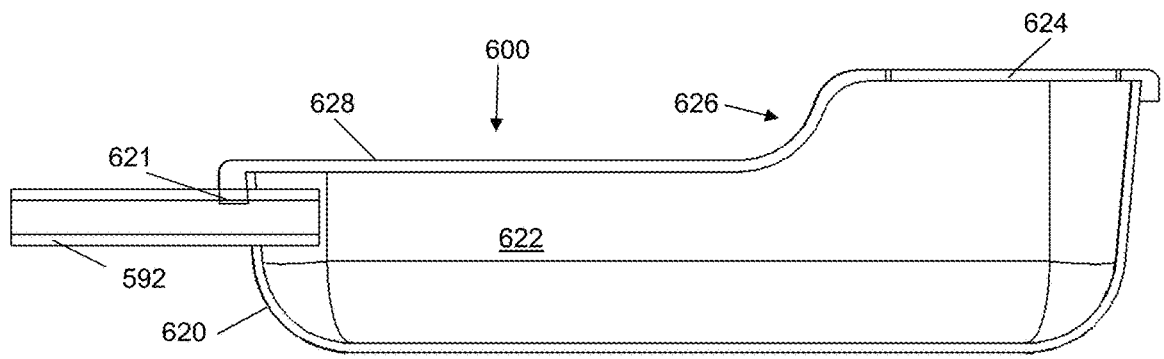
FIGS. 11-13 illustrate a cross-section taken at 11-11 in FIG. 3 of different precipitate collection container embodiments according to the invention.
Figure 12:
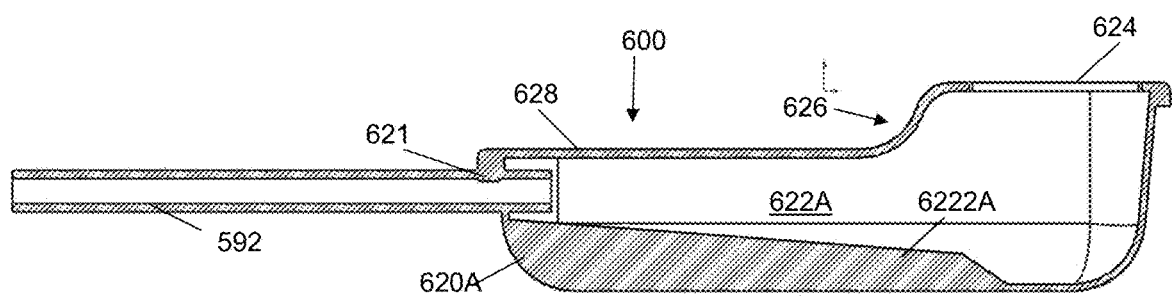
Figure 13:
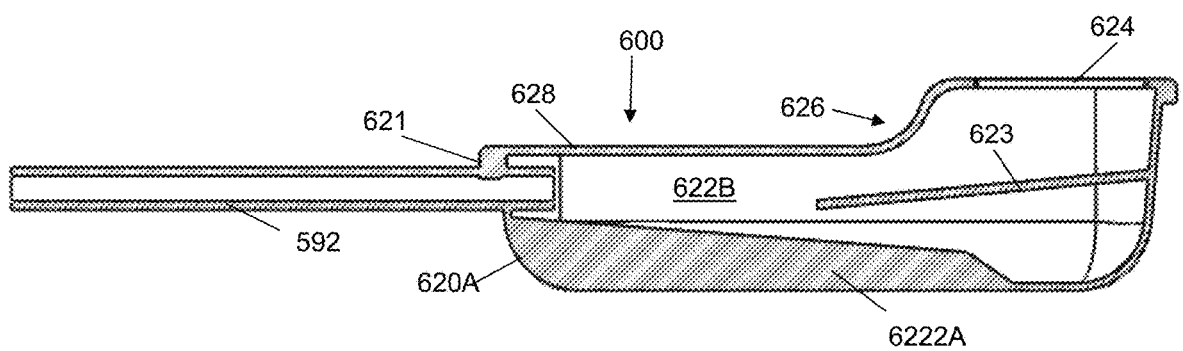
Figure 14:
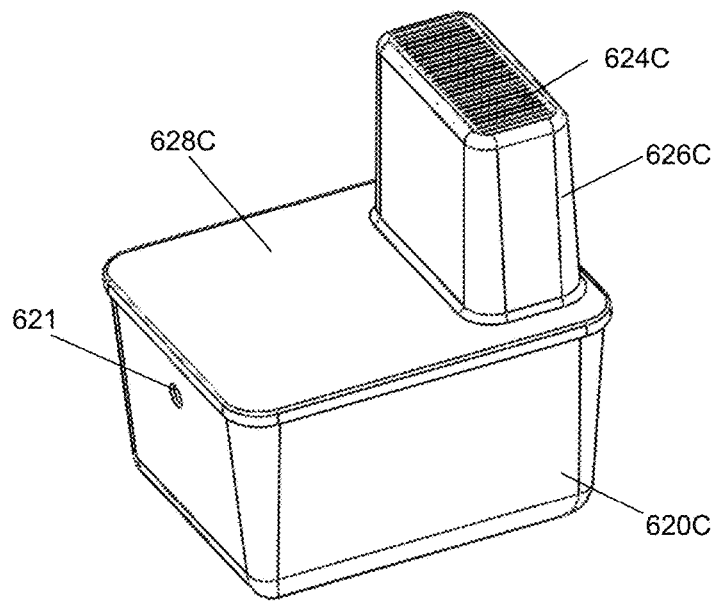
FIG. 14 illustrates a further precipitate collection container embodiment according to the invention.

FIGS. 11-13 illustrate cross-sections of example embodiments for the precipitate collection container 620 where the cross-section is taken at 11-11 in FIG. 3. FIGS. 11-13 illustrate an inlet 621 at the end of the precipitate collection container 620 opposite where the screen 624 and/or exit port 626 are located. Based on this disclosure, it should be appreciated that the exit port 626 extending above the cover 628 may be omitted. FIG. 11 illustrates the precipitate collection container 620 having an inlet 621 through which the conduit 592 attaches to provide a fluid pathway into the cavity 622 to allow for the accumulation of material in the bottom of the precipitate collection container 620 while water is allowed to exit from the precipitate collection container 620 through, for example, the screen 624 (illustrated as part of the exit port 626). Based on this disclosure, it should be understood that the conduit 592 (although shown as extending into the cavity 622) may instead have a connection point external to the cavity 622 such as through a hose connector or other mechanical engagement. FIG. 11 also illustrates a further optional embodiment for the precipitate collection container 620 where the precipitate collection container includes a lid 628 that can be removed so that the collected material can be removed from the precipitate collection container 620. FIG. 12 illustrates another embodiment of the precipitate collection container 620A having a bottom 6222A of the cavity 622A with a slight gradient from the inlet 621 down towards the exit port 626. FIG. 13 illustrates the embodiment from FIG. 12 where the precipitate collection container 620B includes the addition of a screen projection (or wall) 623 extending from the wall opposite of the inlet 621 into the cavity 622B. The screen projection 623 although illustrated as extending at an angle, could instead be substantially horizontal. The screen projection 623 acts as a further barrier to the material escaping from the precipitate collection container 620.

FIG. 14 illustrates an alternative precipitate collection container 620C that includes an inlet 621 that can take the forms discussed above for the inlet. It should be appreciated that additional inlets could be added to accommodate additional conduits or alternatively the inlet could include a manifold attachment for connection to multiple conduits. The illustrated precipitate collection container 620C further includes a lid 628C on which is a riser 626C, which is an example of an exit port, with a screen 624C along its top surface to allow for the flow of water through the precipitate collection container 620C up through the riser 626C while the material is collected inside the device. The various internal configurations discussed for FIGS. 11-13 could also be present within the precipitate collection container 620C.

Figure 15A:
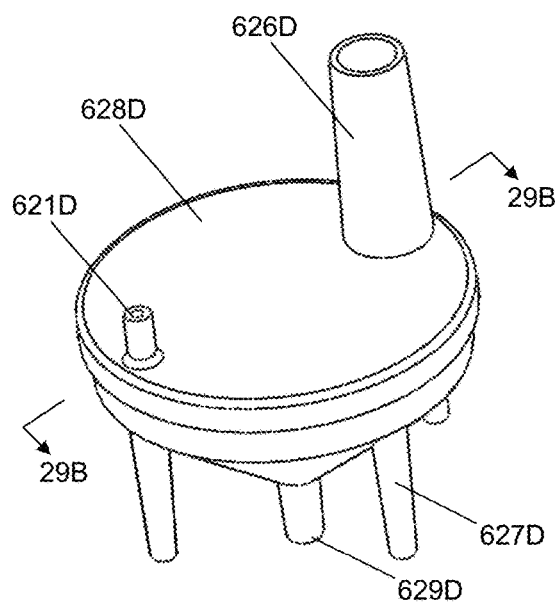
FIGS. 15A and 15B illustrate a further precipitate collection container embodiment according to the invention.
Figure 15B:
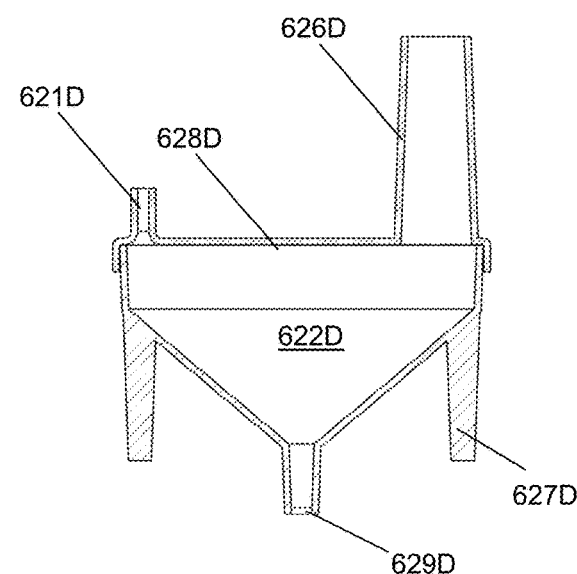

FIGS. 15A and 15B illustrate a funnel shaped precipitate collection container 620D with a whirlpool chamber 622D present within it. Like the previous embodiments, the precipitate collection container 620D includes an inlet 621D for connection to a conduit. It should be appreciated that additional inlets could be added to accommodate additional conduits or alternatively the inlet could include a manifold attachment for connection to multiple conduit. The illustrated precipitate collection container 620D includes a lid 628D on which a riser 626D extends up from to allow for the flow of water through the precipitate collection container 620D while the material is collected inside the device. The funnel shape of the cavity 622D with a particulate port 629D extending from the bottom of the cavity 6222D encourages the formation of a whirlpool, which will pull any material present in the cavity 6222D into a downward flow to drain out the particulate port into another cavity or out of the environment in which the system is running. In a further embodiment, the particulate port 629D includes a valve that can be open to drain any material that has collected in the cavity 6222D as part of a flush operation using the water present in the system to flush the material out of the particulate port 629D. FIG. 19 illustrates an example of the precipitate collection container 620D installed in a water storage tank with the particulate port 629D passing out through the bottom 914 of the tank 910. In a further embodiment, there are multiple inlets and risers evenly spaced about the cover in an alternating pattern. In a still further embodiment, the inlets and/or risers are angled relative to the cover. FIGS. 15A, 15B, and 19 also illustrate an alternative embodiment of the precipitate collection container 620D having a plurality of legs 627D to in part stabilize the precipitate collection container 620D against a surface.

In a further embodiment to the above precipitate collection container embodiments, a diffuser in fluid communication with the conduit is present within the cavity to spread the water and material coming into the cavity out from any direct stream of water and/or material that might otherwise exist. Examples of a diffuser are a structure that expands out from its input side to its output side, mesh or other large opening screen, and steel wool or other similar material with large pores.

In a further embodiment, the precipitate collection container would be replaced by a low flow zone formed in the environment from which the water is being pulled, for example a water tank.

FIGS. 16A-16C provide an illustration of an alternative wing shim a plurality of spacers 272N and a hexagonal support member 276M connecting them and providing alignment of the spacers 272N relative to the support member 276M and the disk 260N. The spacers 272N include a hexagonal opening passing through it to allow it to slide over the support member 276N. The disks 260N include a plurality of hexagonal openings 2602N. The support members 276N extend between the top and lower rotors and in at least one embodiment are attached to the rotors using screws or bolts. Based on this disclosure, one of ordinary skill in the art will appreciate that the cross-section of the support members may take different forms while still providing for alignment of the spacers 272N relative to the disks 260N.

In a further embodiment to at least one of the previously described embodiments, the disk-pack turbine includes a plurality of disks having waveforms present on them as illustrated in FIGS. 17A-18E. Although the illustrated waveforms are either concentric circles (FIGS. 17A and 17B) or biaxial (FIGS. 18A-18E), it should be understood that the waveforms could also be sinusoidal, biaxial sinucircular, a series of interconnected scallop shapes, a series of interconnected arcuate forms, hyperbolic, and/or multi-axial including combinations of these that when rotated provide progressive, disk channels with the waveforms being substantially centered about an expansion chamber. The shape of the individual disks defines the waveform, and one approach to creating these waveforms is to stamp the metal used to manufacture the disks to provide the desired shapes. Other examples of manufacture include machining, casting (cold or hot), injection molding, molded and centered, and/or electroplating of plastic disks of the individual disks. The illustrated waveform disks include a flange 2608, which may be omitted depending on the presence and/or the location of the wing shims, around their perimeter to provide a point of connection for wing shims 270 used to construct the particular disk-pack turbine. In a further embodiment, the wing shims 270 are located around and proximate to the expansion chamber in the disk turbine. In a further embodiment, the wing shims are omitted and replaced by, for example, stamped (or manufactured, molded or casted) features that provide a profile axially and/or peripherally for attachment to a neighboring disk or rotor.

In a variety of embodiments the disks have a thickness less than five millimeters, less than four millimeters, less than three millimeters, less than and/or equal to two millimeters, and less than and/or equal to one millimeter with the height of the disk chambers depending on the embodiment having approximately 1.3 mm, between 1.3 mm to 2.5 mm, of less than or at least 1.7 mm, between 1.0 mm and 1.8 mm, between 2.0 mm and 2.7 mm, approximately 2.3 mm, above 2.5 mm, and above at least 2.7 mm. Based on this disclosure it should be understood that a variety of other disk thickness and/or disk chamber heights are possible while still allowing for assembly of a disk-pack turbine for use in the illustrated systems and disk-pack turbines. In at least one embodiment, the height of the disk chambers is not uniform between two neighboring nested waveform disks. In a still further embodiment, the disk chamber height is variable during operation when the wing shims are located proximate to the center openings.

Figure 18D:
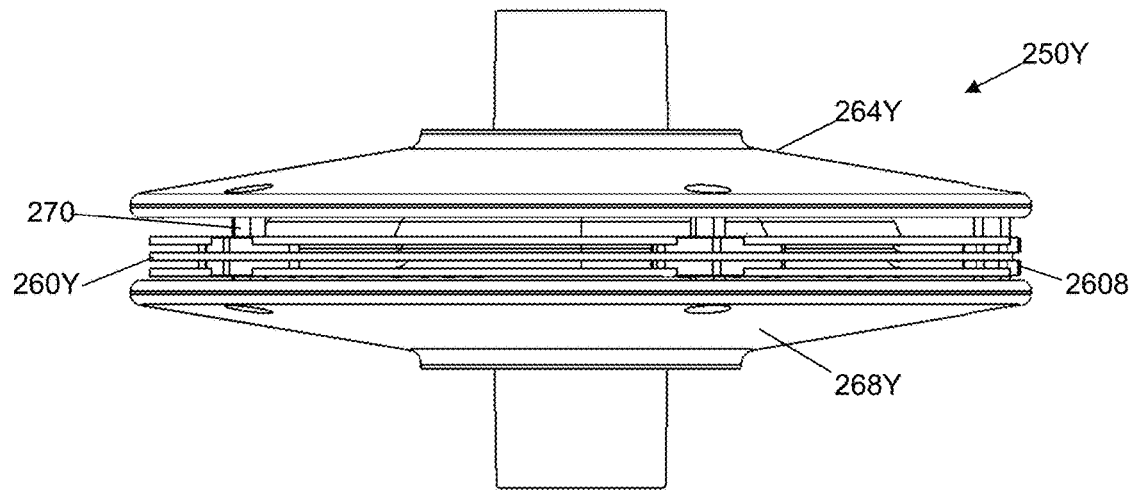
Figure 18E:
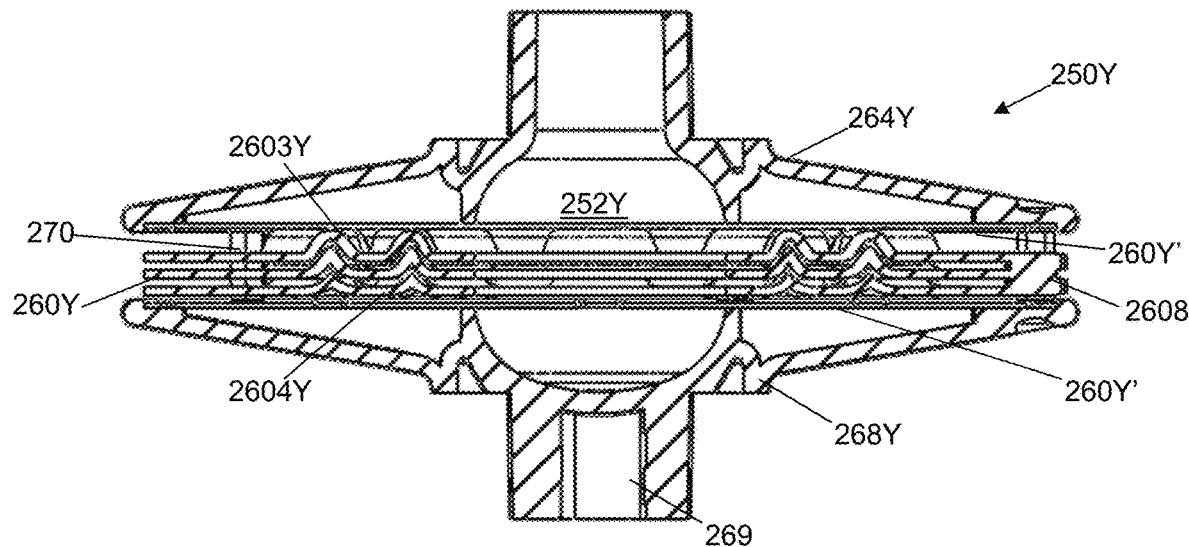

FIGS. 17A-18E illustrate respective disk-pack turbines 250X, 250Y that include an upper rotor 264X and a lower rotor 268X that have a substantially flat engagement surface (other than the expansion chamber elements) facing the area where the disks 260X, 260Y are present. In an alternative embodiment illustrated in FIG. 18E, the disk-pack turbine includes an upper rotor 264Y and a lower rotor 268Y with open areas between their periphery and the expansion chamber features to allow the waveforms to flow into the rotor cavity and thus allow for more disks to be stacked resulting in a higher density of waveform disks for the disk-pack turbine height with the omission of substantially flat disks 260Y' that are illustrated as being covers over the open areas of the rotors 264Y, 268Y. FIG. 18E also illustrates an alternative embodiment where there is a mixture of substantially flat disks 260Y' and nested waveform disks 260Y. FIGS. 17A-18E illustrate how the waveforms include descending thickness waves in each lower disk. In at least one embodiment, the waveforms are shallow enough to allow substantially the same sized waveforms on neighboring disks.

FIG. 17A illustrates a side view of an example of the circular waveform disk-pack turbine 250X. FIG. 17B illustrates a cross-section taken along a diameter of the disk-pack turbine 250X and shows a view of the disks 260X. Each circle waveform is centered about the expansion chamber 252X. The illustrated circle waveforms include two ridges 2603X and three valleys 2604X. Based on this disclosure, it should be appreciated that the number of ridges and valleys could be reversed along with be any number greater than one limited by their radial depth and the distance between the expansion chamber 250X and the flange 2608.

FIG. 18A illustrates a top view of a disk-pack turbine 250Y without the top rotor 264X to illustrate the biaxial waveform 2602Y, while FIGS. 18B-18E provide additional views of the disk-pack turbine 250Y. FIGS. 18A-18E provide an illustration of the waveforms rising above the disk while not dropping below the surface (or vice versa in an alternative embodiment). The illustrated biaxial waveform 2602Y that is illustrated as including two ridges 2603Y and one valley 2604Y centered about the expansion chamber 252Y. Based on this disclosure, it should be appreciated that the number of ridges and valleys could be reversed along with be any number greater than one limited by their radial depth and the distance between the expansion chamber 252Y and the flange 2608. FIG. 18B illustrates a side view of three waveform disks 260Y stacked together without the presence of wing shims 270 or the rotors 264X, 268X. FIG. 18C illustrates a partial cross-section of the disk-pack turbine 250Y. FIG. 18D illustrates a side view of the assembled disk-pack turbine 250Y. FIG. 18E illustrates a cross-section taken along a diameter of the disk-pack turbine 250X and shows a view of the disks 260Y.

FIG. 19 illustrates an alternative embodiment of the system installed in a water storage tank 910, which is partially cut-away to show what is present inside the storage tank. The illustrated system includes the housing module 500, the intake module 400 (not shown), the disk-pack module 200 (not shown), and the vortex module 100 (not shown) of the previous embodiments.

Also illustrated in FIG. 19 is an example of a particulate collection container 620D that was previously discussed in connection with FIGS. 15A and 15B. FIG. 19 illustrates how the particulate port 629D will pass through the bottom 914 of the tank 910, which in at least one alternative embodiment includes a gasket or other seal around the particulate port 629D.

In an alternative embodiment, the system also includes an external A/C motor driving the disk-pack turbine through a drive system such as indirect drive linkage including, for example but not limited to, one or more belts (e.g., O-rings) or a transmission linkage that is present in a belt housing that passes through the water storage wall 912 and provides a compartment connecting the driveshaft connected to the disk-pack turbine, which is present in the housing, and the motor driveshaft. The alternate embodiment places the motor housing external to the storage tank 910 so that the motor does not need to be a submersible motor. If multiple belts are included with the system and the driveshaft from the motor includes a plurality of gears, then the size of the belt is selected to drive the disk-pack turbine at a predetermined set speed. Alternatively, the driveshaft engaging the disk-pack turbine may include the gears in addition or instead of the external driveshaft.

In at least one embodiment the belt housing is sealed and held in place by a gasket that fits snugly around it and engages a cutout (or other opening) created in the water storage tank wall 912. The gasket connection provides an advantageous anchoring point for the system within the water storage tank.

In a further embodiment, the conduit 592 is passed through the belt housing through holes with gaskets at a point inside the water storage tank and exiting out from the belt housing at a point external to the water storage tank.

In a further embodiment, the system includes a controller that controls the operation of the system. The above-described motor modules may be provided with a variety of operation, control, and process monitoring features. Examples include a switch (binary and variable), computer controlled, or built-in controller resident in the motor module. Examples of a built-in controller include an application specific integrated circuit, an analog circuit, a processor or a combination of these. The controller in at least one embodiment provides control of the motor via a signal or direct control of the power provided to the motor. The controller in at least one embodiment is programmed to control the RPM of the motor over a predetermined time based on time of day/week/month/year or length of time since process start, and in other embodiments the controller responds to the one or more characteristics to determine the speed at which the motor is operated. In a further embodiment, the controller runs for a predetermined length of time after water has been added to the storage tank. In a further embodiment, the controller also controls operation of the supplemental valve 294 when present in an embodiment with a controller.

In at least one embodiment, the controller monitors at least one of the voltage, amperage, watts, hours of run time (current operation period and/or total run time) and speed (rotations per minute (RPM)) of the motor to determine the appropriate level of power to provide to the motor for operation and/or adjust the speed of the motor. Other examples of input parameters include chemical oxygen demand (COD), biological oxygen demand (BOD), pH, ORP, dissolved oxygen (DO), bound oxygen and other concentrations of elements and/or lack thereof and have the controller respond accordingly by automatically adjusting operational speeds and run times.

A prototype using a discharge outlet built according to at least one embodiment of the invention was placed into a tank having a capacity of at least 100 gallons and substantially filled to capacity with water, which caused the system to be completely submerged in water. The system was started up with submerged lights placed around and aimed at the discharge port to capture the images depicted in FIGS. 20A and 20B, which are both enlarged to the same amount and have light coming from the right side of the image. These images were captured from a slow-motion video taken with a macro lens. FIG. 20A shows the relative size of the vortical solitons that were discharged from the discharge outlet relative in size to an adult male's fingers. The vortical solitons spin and rotate about their centers as they move up and down within the water. The vortical solitons appear to be substantially flat vortex disc that are spinning and moving based on the captured video as represented in the images depicted in FIGS. 20A and 20B. The images include countless pairs of vortical solitons that upon discharge from the discharge outlet 232 wholly saturate the water within a contained environment with each soliton persisting until its energy is discharged via contact with a solid boundary or an obstruction. Although the water is saturated with these vortical packets of rotating energy, each maintains a relative distance of separation from its other soliton in the pair without collision with the other soliton. From review of the video, it appears that the soliton pairs move in complete lockstep with each other as they progress through the water environment while turning and spinning. It is believed that this restructuring of the water allows in part for it to impact the larger volume of water in which the system runs, because these vortical solitons will continue on their respective paths until interfered with by another object such as the wall of the container or other structural feature.

It should be noted that the present invention may, however, be embodied in many different forms and should not be construed as limited to the embodiments and prototype examples set forth herein; rather, the embodiments set forth herein are provided so that the disclosure will be thorough and complete, and will fully convey the scope of the invention to those skilled in the art. The accompanying drawings illustrate embodiments according to the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic. "Substantially" also is used to reflect the existence of manufacturing tolerances that exist for manufacturing components.

The foregoing description describes different components of embodiments being "in fluid communication" to other components. "In fluid communication" includes the ability for fluid to travel from one component/chamber to another component/chamber.

Based on this disclosure, one of ordinary skill in the art will appreciate that the use of "same", "identical" and other similar words are inclusive of differences that would arise during manufacturing to reflect typical tolerances for goods of this type.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. A disk-pack turbine comprising:
   a top rotor having an opening passing through its axial center;
   a plurality of disks each having an opening passing through its axial center, at least two waveforms centered about the opening, and a flange;
   a bottom rotor; and
   a plurality of wing shims connecting said top rotor, said plurality of disks, and said bottom rotor wherein, each wing shim is connected to at least one of the flanges.

2. The disk-pack turbine according to claim 1, wherein the thickness of each disk is less than 2.5 mm, and the height of a space between neighboring disks is less than 2.5 mm.

3. The disk-pack turbine according to claim 1, wherein said waveform includes at least one ridge and at least one channel.

4. The disk-pack turbine according to claim 1, wherein said waveform includes at least one circular and/or at least one biaxial waveform.

5. The disk-pack turbine according to claim 1, wherein said waveform includes at least one of the following: sinusoidal, biaxial sinucircular, a series of interconnected scallop shapes, a series of interconnected arcuate forms, hyperbolic, and/or multi-axial including combinations of these.

6. The disk-pack turbine according to claim 1, wherein each of said plurality of disks has a substantially uniform thickness throughout the disk.

7. The disk-pack turbine according to claim 6, wherein said waveform includes at least one ridge and at least one channel.

8. The disk-pack turbine according to claim 6, wherein said waveform includes at least one circular and/or at least one biaxial waveform.

9. The disk-pack turbine according to claim 6, wherein said waveform includes at least one of the following: sinusoidal, biaxial sinucircular, a series of interconnected scallop shapes, a series of interconnected arcuate forms, hyperbolic, and/or multi-axial including combinations of these.

10. The disk-pack turbine according to claim 1, wherein each disk having said flange around a perimeter of said disk,
    said wing shims are spaced around said perimeters of said disks.

11. The disk-pack turbine according to claim 10, wherein the axial center openings of said top rotor and said disks define an expansion chamber,
    each disk having a second flange around the opening of said disk,
    said wing shims include wing shims spaced around said second flanges proximate to the expansion chamber.

12. The disk-pack turbine according to claim 1, wherein
the axial center openings of said top rotor and said disks define an expansion chamber,
each disk having said flange around the opening of said disk,
said wing shims are spaced around said flanges proximate to the expansion chamber.

13. The disk-pack turbine according to claim 12, wherein each support member extends from said top rotor to said bottom rotor.

14. The disk-pack turbine according to claim 1, wherein each wing shim includes
a support member, and
a plurality of spacers on said support member.

15. A method comprising:
drawing water into and up through a plurality of conduits from a source environment from which the water is drawn;
forming a vortex flow of the water in a vortex chamber that receives the water from the plurality of conduits;
discharging the water from the vortex chamber into an expansion chamber defined in a disk-pack turbine;
channeling the water between spaces that exist between disks of the disk-pack turbine to travel from the expansion chamber to an accumulation chamber surrounding the disk-pack turbine;
routing the water through the accumulation chamber to a discharge chamber; and
forming a vortical flow of the water up through the discharge chamber back into the source environment from which the water was drawn and a downward flow of solids to a discharge port.

16. The method of claim 15, wherein the vortical flow of the water includes a plurality of vortical solitons that flow into the environment containing the water.

17. The method of claim 15, further comprising drawing water into a housing that encloses the plurality of conduits and the vortex chamber where the housing draws the water from below a height of the vortex chamber.

18. The method of claim 17, wherein the vortical flow of the water includes a plurality of vortical solitons that flow into the environment containing the water.

19. A system comprising:
a vortex module;
a disk-pack module in fluid communication with said vortex module;
a motor connected to said disk-pack module;
a housing module, said housing module having installed therein at least said vortex module and said disk-pack module;
a water storage tank, into which said housing module is installed, said water storage tank having an opening in its floor;
at least one discharge tube connected to said disk-pack module, said at least one discharge tube passing through the opening in the floor of the water storage tank to discharge precipitate in a location exterior to the system, said water storage tank opening is sealed around said at least one discharge tube; and
a controller in electrical communication with said motor, said controller configured to control the operation of said motor.

20. The system according to claim 19, wherein said disk-pack module including
a disk-pack turbine in fluid communication with said vortex module and connected to said motor,
a disk-pack housing with an accumulation chamber in which said disk-pack turbine is located, and
a discharge outlet in fluid communication with said accumulation chamber and connected to said at least one discharge tube.

* * * * *